(12) United States Patent
Seki et al.

(10) Patent No.: US 6,330,603 B1
(45) Date of Patent: Dec. 11, 2001

(54) COMMUNICATION APPARATUS, COMMUNICATION METHOD, AND RECORD MEDIUM

(75) Inventors: Toshibumi Seki, Odawara; Takeshi Tanaka, Kawasaki; Yasuo Namioka, Asaka; Haruhiko Iida, Fuchu; Yoshio Kataoka; Hideaki Shiotani, both of Kawasaki; Hitoya Nakamura, Tokyo; Akira Kagaya, Yokohama; Keisuke Hashimoto, Fuchu, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/030,004

(22) Filed: Feb. 25, 1998

(30) Foreign Application Priority Data

Feb. 26, 1997 (JP) .................................................. 9-042723
Feb. 26, 1997 (JP) .................................................. 9-042724

(51) Int. Cl.⁷ ................................................. G06F 15/173
(52) U.S. Cl. ............................ 709/226; 709/223; 709/235
(58) Field of Search .................................... 709/232, 233, 709/235, 229, 223, 224, 226; 370/229, 466, 416, 468

(56) References Cited

U.S. PATENT DOCUMENTS 5,987,069 * 11/1999 Furukawa et al. ............... 375/261
5,991,308 * 11/1999 Fuhrmann et al. ............... 370/474
6,167,095 * 12/2000 Furukawa et al. ............... 375/285

OTHER PUBLICATIONS

L. Zhang, et al., "RSVP: A New Resource ReSerVation Protocol", IEEE Network Magazine, Sep. 1993, pp. 1–22.

A. Tsukada, et al., "Communication QoS and its Guarantee in Industrial Systems", Technical Report of IEICE, CPSY95–110, Mar. 1996, pp. 7–13.

* cited by examiner

*Primary Examiner*—Mehmet B. Geckil
(74) *Attorney, Agent, or Firm*—Oblon, Spivak, McClelland, Maier & Neustadt, P.C.

(57) ABSTRACT

With an index that represents the content of a message, a communication band is assigned. At this point, communication bands are managed as fixed bands and variable bands. An index is used to secure a fixed band when the transmission a data flow corresponding to a communication request is started. In addition, an index is used to coordinate variable bands. Thus, priority levels of communication requests are objectively designated corresponding to the contents of communication requests and features of mediums. In the case that a fixed band and a variable band are secured, when a function for scheduling and reserving communication resources for communication requests is accomplished, priority levels are objectively designated with an index.

26 Claims, 20 Drawing Sheets

FIG. 4

| LARGE CATEGORY | INTERMEDIATE CATEGORY | SMALL CATEGORY | EVALUATION VALUE ||||
|---|---|---|---|---|---|---|
| | | | PICTURE DATA | SOUND DATA | TEXT DATA | ... |
| EMERGENCY INFORMATION | DISASTERS | | 10 | 10 | 10 | |
| | HAPPY EVENTS | | 10 | 7 | 10 | |
| | REPORT OF DEATH | | 10 | 8 | 10 | |
| | ... | ... | | | | |
| COMMERCIALS | CARS | ... | | | | |
| | FOODS | ... | | | | |
| | CLOTHS | ... | | | | |
| | | ... | | | | |
| PICTURE INFORMATION | MOVIES | HORROR | 7 | | | |
| | | ADULT | 7 | | | |
| | | DOCUMENTARY | 10 | | | |
| | | ... | | | | |
| | DOCUMENTARY | POLITICS | | | | |
| | | ECONOMICS | | | | |
| | | ... | | | | |
| | SPORTS | | | | | |
| | | ... | | | | |
| | | ... | | | | |
| | VARIETIES | COMEDIES | | | | |
| | | ... | | | | |
| | | ... | | | | |
| SOUND INFORMATION | MUSIC | CLASSICS | | | | |
| | | POPS | | | | |
| | | FOLK SONGS | | | | |
| | | IDOLS | | | | |
| | | ... | | | | |
| COMPUTER NETWORKS | | "NIFTY-SERVE | | | | |
| | | "BEKKO-AME" NET | | | | |
| | | ... | | | | |
| TELEPHONES | | | | | | |

FIG. 5

| CATEGORY | SCENE CATEGORY | EVALUATION VALUE |
|---|---|---|
| SPORTS | REPLY | 10 |
| | DECISIVE MOMENT | 10 |
| | NORMAL | 5 |
| | INTERVAL | 4 |
| | IDLING | 3 |
| MOVIES | CLIMAX | 10 |
| | DECISIVE MOMENT | 10 |
| | NORMAL | 5 |
| | INTERVAL | 4 |
| | IDLING | 3 |
| | RESTRICTED LEVEL 1 | -1 |
| | RESTRICTED LEVEL 2 | -2 |
| | ... | ... |
| ... | ... | ... |

FIG. 9

| DATA INFORMATION | INDEX<br>TITLE<br>LICENCE FEE<br>SIZE<br>TRANSMISSION TIME<br>FULL TRANSMISSION BAND WIDTH<br>MINIMUM TRANSMISSION BAND WIDTH | PICTURE INFORMATION, MOVIE, SFX<br>JURASSIC WARS<br>¥300-<br>600Mbyte<br>90min<br>60Kbyte/Sec<br>20Kbyte/Sec |
|---|---|---|
| FEE | TRANSMISSION FEE (FIXED BAND)<br>TRANSMISSION FEE UNIT PRICE (FIXED BAND)<br>TRANSMISSION FEE (VARIABLE BAND) | 375<br>10/ 3.6 Mbytes/ H<br>1/ 10 Mbytes/ H |
| USER'S REQUEST | REQUESTED FIXED BAND WIDTH<br>TRANSMISSION START DATE AND TIME<br>... | 25Kbyte/Sec(50%)<br><br>... |

TRANSMISSION FEE
(FIXED BAND): 10/ 3.6 MB/ H,
(VARIABLE BAND): 1/ 10 MB/ H

FIG. 10

| DATA INFORMATION | INDEX<br>TITLE<br>LICENCE FEE<br>SIZE<br>TRANSMISSION TIME<br>FULL TRANSMISSION BAND WIDTH<br>MINIMUM TRANSMISSION BAND WIDTH | PICTURE INFORMATION, MOVIE, SFX<br>JURASSIC WARS<br>¥300-<br>600Mbyte<br>90min<br>50Kbyte/Sec<br>20Kbyte/Sec |
|---|---|---|
| FEE | TRANSMISSION FEE (FIXED BAND)<br>TRANSMISSION FEE UNIT PRICE (FIXED BAND)<br>TRANSMISSION FEE (VARIABLE BAND) | 525<br>10/ 3.6 Mbytes/ H<br>1/ 10 Mbytes/ H |
| USER'S REQUEST | REQUESTED FIXED BAND WIDTH<br>TRANSMISSION START DATE AND TIME<br>... | 35Kbyte/Sec(70%)<br>DECEMBER 24, 1994 19:00<br>... |

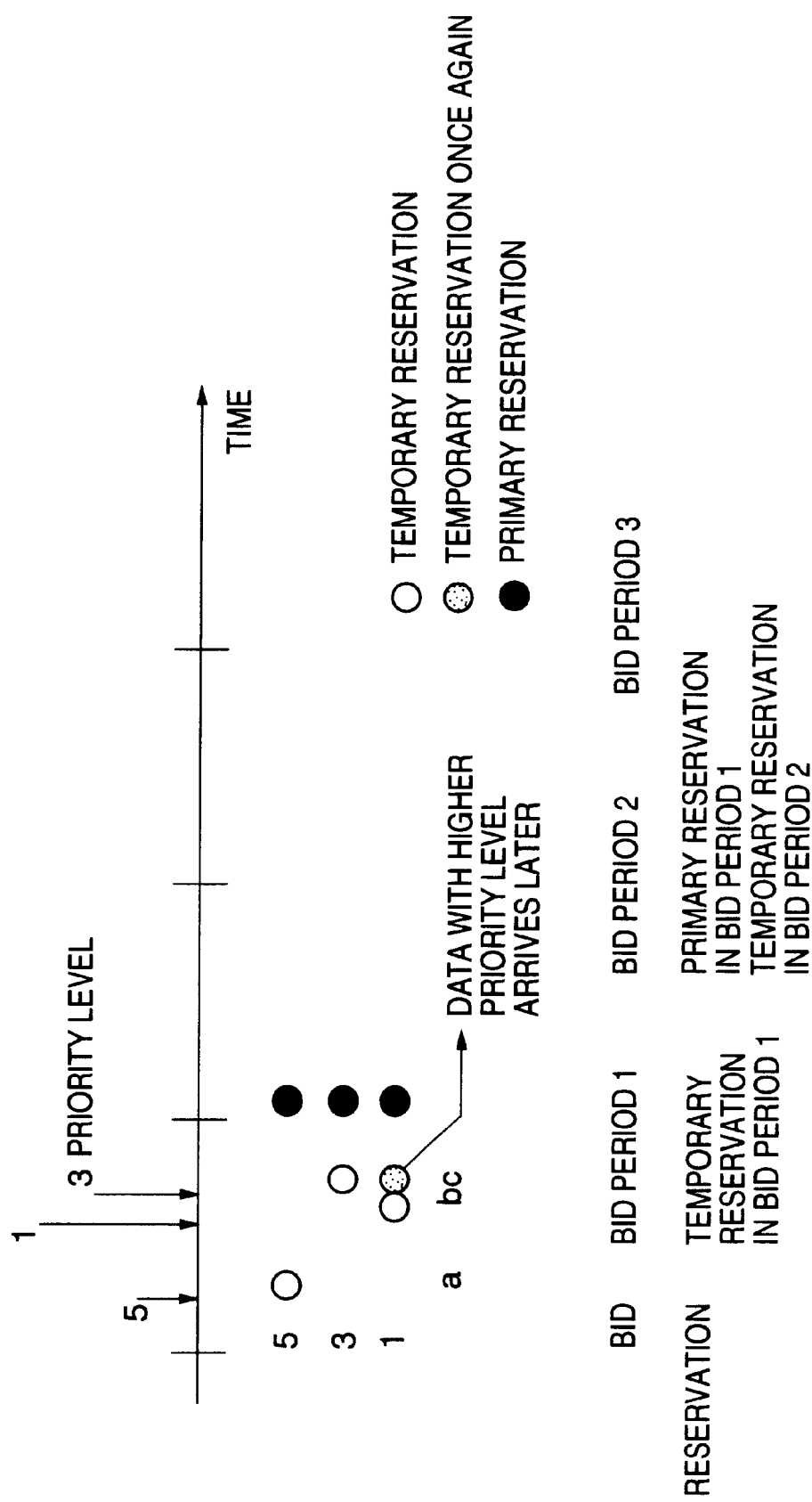

AREA WITH NUMERAL: MINIMUM TRANSMISSION BAND
AREA WITHOUT NUMERAL: FIXED BAND ADDED BY USER REQUEST
HATCHED AREA: AREA DISCARDED BY SCHEDULING

FIG. 19

| DATA INFORMATION | INDEX<br>TITLE<br>LICENCE FEE<br>SIZE<br>TRANSMISSION TIME<br>FULL TRANSMISSION BAND WIDTH<br>MINIMUM TRANSMISSION BAND WIDTH | PICTURE INFORMATION, MOVIE, SFX<br>JURASSIC WARS<br>¥300-<br>600Mbyte<br>90min<br>50Kbyte/Sec<br>20Kbyte/Sec |
|---|---|---|
| FEE | TRANSMISSION FEE (FIXED BAND)<br>TRANSMISSION FEE UNIT PRICE (FIXED BAND)<br>TRANSMISSION FEE (VARIABLE BAND) | 375<br>10/ 3.6 Mbytes/ H<br>1/ 10 Mbytes/ H |
| USER'S REQUEST | REQUESTED FIXED BAND WIDTH<br>TRANSMISSION START DATE AND TIME<br>... | 25Kbyte/Sec(50%)<br>DECEMBER 24, 1996  19:00<br>... |

FIG. 20

| DATA INFORMATION | INDEX<br>TITLE<br>LICENCE FEE<br>SIZE<br>TRANSMISSION TIME<br>FULL TRANSMISSION BAND WIDTH<br>MINIMUM TRANSMISSION BAND WIDTH | PICTURE INFORMATION, MOVIE, SFX<br>JURASSIC WARS<br>¥300-<br>600Mbyte<br>90min<br>50Kbyte/Sec<br>20Kbyte/Sec |
|---|---|---|
| FEE | TRANSMISSION FEE (FIXED BAND)<br>TRANSMISSION FEE UNIT PRICE (FIXED BAND)<br>TRANSMISSION FEE (VARIABLE BAND) | 525<br>10/ 3.6 Mbytes/ H<br>1/ 10 Mbytes/ H |
| USER'S REQUEST | REQUESTED FIXED BAND WIDTH<br>TRANSMISSION START DATE AND TIME<br>... | 35Kbyte/Sec(70%)<br>DECEMBER 24, 1996  21:00<br>... |

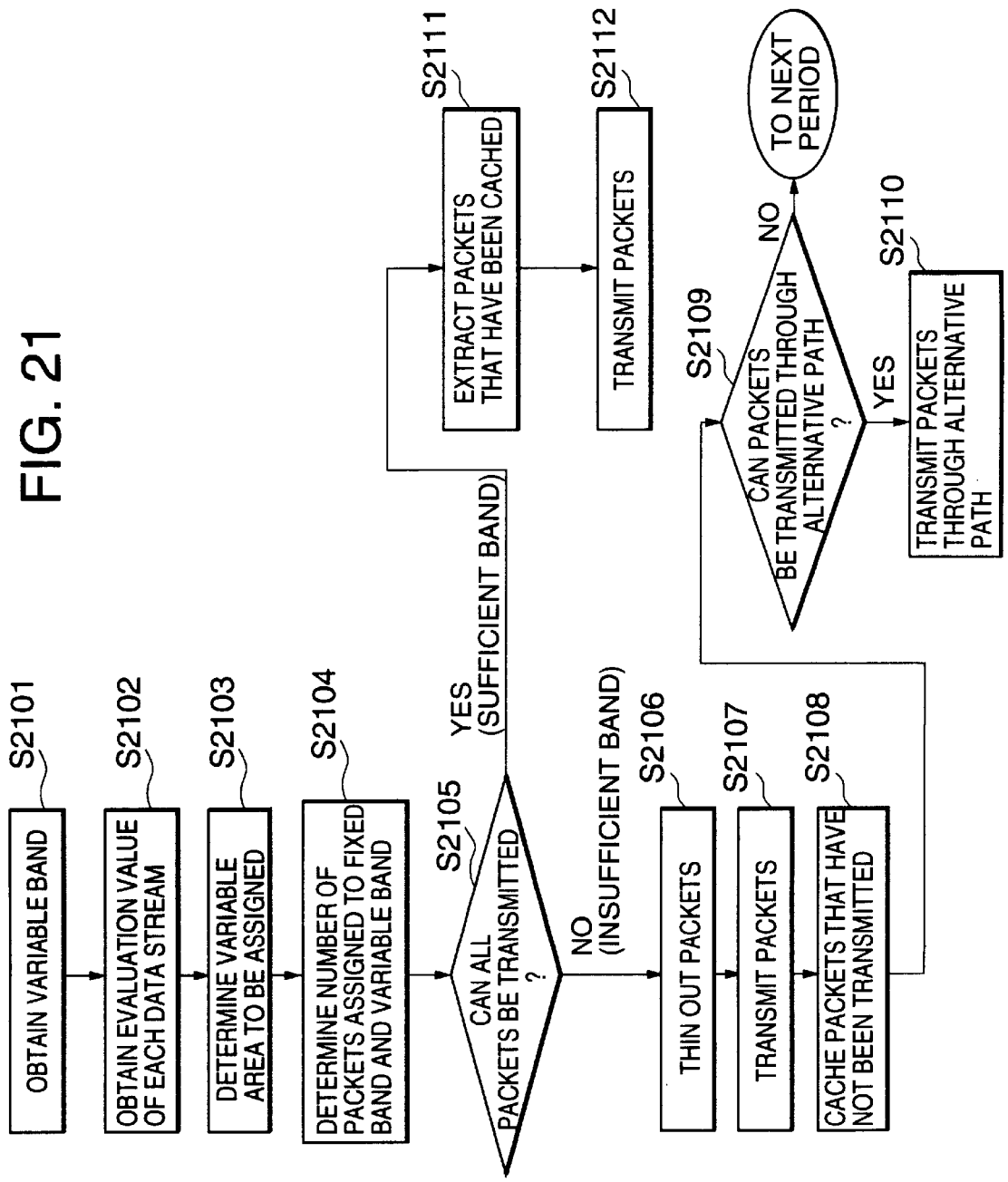

COMMUNICATION APPARATUS, COMMUNICATION METHOD, AND RECORD MEDIUM

BACKGROUND OF THE INVENTION

1. Field of the Invention

The present invention relates to a communication apparatus for securing communication resources corresponding to a requested quality, a communication method thereof, and a record medium thereof.

2. Description of the Related Art

As Internet/Intranet is becoming common, distributed systems are drastically popularizing. However, since the systems are becoming complicated and large-scaled and component-ware is being used, it is very difficult to grasp the entire program and entire system. Thus, it is difficult to numerically analyze a system for simulating and modeling the system. In other words, when a system is developed, it cannot be satisfactorily designed and developed. A major cause that prevents an evaluation of the system performance is in that a plurality of jobs share one resource. Many users share a network resource and a computing resource. Since each user has a different optimizing standard, it is difficult to predict a system performance. When the system performance is predicted, the user also requires the worst data of the system performance as well as the average data thereof. However, in a complicated system that a plurality of users share, such worst data tends to exceed engineering experience data. Thus, in this case, a logical analysis does not well work. In a real experiment, since data that creates the worst situation cannot be prepared, the operational worst situation cannot be simulated. Consequently, the performance evaluation/prediction problem becomes complicated. For example, in the conventional computer communication field such as Internet, the best effort system is employed. In the best effort system, a communication resources are equally shared by a plurality of users. Thus, since a communication of a particular user is affected by communications of other communication users, it is difficult to secure a required band for the particular user. To solve this problem, the transmission rate of data is measured on the receive side. The obtained information is fed back to the sender side. Thus, the sender side controls the transmission rate of the data. When the communication rate is low, the sender side decreases information. Consequently, a data transmission at a constant transmission rate is accomplished. However, in this method, to send feedback information, another line is required. In addition, regardless of the content of the transmission data, the information is flatly decreases. This method is referred to as a data decreasing method.

As band securing type communication systems other than the best effort system, ATM (Asynchronous Transfer Mode) communication system and RSVP (Resource Reservation Protocol) system are being studied. However, in these systems, as the types of data handled on networks increase, regardless of features of data, required communication bands are successively assigned to users on "first come, first served" basis. Thus, when a required communication band cannot be secured, the communication request is refused. Consequently, the user should wait until the communication resource becomes available.

As described above, in the data decreasing method, it is difficult to secure a required band in the computer communication field. In this method, another line is required. In addition, information is flatly decreased regardless of the content of the data. On the other hand, in the ATM system and the RSVP system, when a required band cannot be secured, the request is refused. Thus, the user should wait until the communication resource becomes available.

When limited communication resources are shared by many unspecified users, priority levels that are in common with the network should be designated. Corresponding to the priority levels, the resources should be equally assigned to the users.

For example, when picture data to be sent/received is used for a news material, if the real-time transmission of the data is the most important and the picture quality thereof is not so important, it is necessary to decrease the data corresponding to the variation of the communication amounts of routers and servers. Thus, other communication requests can be satisfied and many users can be provided with services.

In contrast, when data to be sent/received is used for movie information, if the picture quality is important than the real time transmission, as long as available transmission start time is provided, the user can wait until the available transmission time. To do that, reservations for communication resources should be made on time axis.

In addition, in the case of data of a movie, the data may contain a climax portion that requires high picture quality and a normal portion that does not require high picture quality. In this case, if information is flatly decreased, the worth of the movie data is lost. Thus, the decreasing method of information should be dynamically varied corresponding to the situation.

SUMMARY OF THE INVENTION

A first object of the present invention is to provide a communication apparatus for effectively assigning communication resources, a communication method thereof, and a record medium thereof.

A second object of the present invention is to provide a communication apparatus for suppressing information with high quality that is not required from being transmitted and thereby decreasing the traffic amount, a communication method thereof, and a record medium thereof.

A third object of the present invention is to provide a communication apparatus for preventing a communication request from being refused even in a busy state of a communication path, a communication method thereof, and a record medium thereof.

A fourth object of the present invention is to provide a communication apparatus for allowing service start time and service end time to be sent to the user, a communication method thereof, and a record medium thereof.

A fifth object of the present invention is to provide a communication apparatus for allowing communication requests to be scheduled corresponding to priority levels thereof and thereby weighting services, a communication method thereof, and a record medium thereof.

A sixth object of the present invention is to provide a communication apparatus for coordinating communication resources among communication requests and thereby improving the probability of the transmission of data of the communication requests, a communication method thereof, and a record medium thereof.

A seventh object of the present invention is to provide a communication apparatus for supplying information with higher than requested quality corresponding to a loaded situation of a communication path, a communication method, and a record medium.

A first aspect of the present invention is an apparatus for transmitting communication information to a communication path, comprising a determining means for determining the content of communication information to be transmitted, and an assigning means for assigning a band of the communication path corresponding to the content determined by the determining means.

A second aspect of the present invention is an apparatus for assigning a communication resource of a communication path corresponding to a transmission request of communication information, comprising a temporarily reserving means for temporarily reserving the communication resource of the communication path corresponding to the communication request, a scheduling means for scheduling the temporary reservation in a predetermined bid period, and a primarily reserving means for changing the temporary reservation to a primary reservation of the communication resource of the communication path corresponding to the scheduling.

A third aspect of the present invention is an 14. A method for transmitting communication information to a communication path, comprising the steps of (a) determining the content of the communication information to be transmitted, and (b) assigning a band of the communication path corresponding to the determined content.

A fourth aspect of the present invention is a method for assigning a communication resource of a communication path corresponding to a transmission request of communication information, comprising the steps of (a) temporarily reserving the communication resource of the communication path corresponding to the communication request, (b) scheduling the temporary reservation in a predetermined bid period, and (c) changing the temporary reservation to a primary reservation of the communication resource of the communication path corresponding to the scheduling.

A fifth aspect of the present invention is a record medium from which a program for an apparatus for transmitting communication information to a communication path is read, the program performing the functions of (a) determining the content of the communication information to be transmitted, and (b) assigning a band of the communication path corresponding to the determined content.

A sixth aspect of the present invention is a record medium from which a program for an apparatus for assigning a communication resource of a communication path corresponding to a transmission request of communication information is read, the program performing the functions of (a) temporarily reserving the communication resource of the communication path corresponding to the communication request, (b) scheduling the temporary reservation in a predetermined bid period, and (c) changing the temporary reservation to a primary reservation of the communication resource of the communication path corresponding to the scheduling.

According to the present invention, with an index representing the content of a communication request, a communication band is assigned to data corresponding to the communication request. According to the present invention, communication bands secured for transmitting information are separately managed as fixed bands and variable bands. The fixed bands are bands that are not decreased. A fixed band width is assigned when a communication flow is started. The variable bands are coordinated among communication flows corresponding to fluctuations of loaded states of the relevant router and the relevant server. An index is used to secure a fixed band when a communication flow is started. In addition, when variable bands are coordinated and priority levels are objectively designated corresponding to communication contents and features of mediums, an index is used. When fixed bands and variable bands are secured, in consideration of the case that they cannot be promptly secured, communication requests are scheduled so as to reserve data flows. In this case, with an index, priority levels are objectively designated.

According to the present invention, communication requests for communication requests that are exchanged between computers through the network can be reserved. Thus, even if the communication path is busy, a communication request is not refused. Instead, service start time and service end time are provided to the user of the service request.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 4 is an example of an index table that lists types of data publicized on the network;

FIG. 5 is an example of a table showing an scene index;

FIG. 9 is a table showing an example of data transmission definition information sent from a server to a terminal unit;

FIG. 10 is a table showing an example of the data transmission definition information including a user's request sent from a terminal unit to a server;

FIG. 11 is a schematic diagram showing an example of a bidding method 1 of which the length of a bid period is constant and data flows are scheduled for temporary reservations in the bid period as a method for assigning communication resources to the data flows;

FIG. 19 is a table showing an example of data transmission definition information as an alternative sent from a server to a terminal unit;

FIG. 20 is a table showing another example of data transmission definition information as an alternative sent from a server to a terminal unit;

FIG. 21 is a flow chart showing a process of a variable band assigning portion;

DESCRIPTION OF PREFERRED EMBODIMENTS

Next, with reference to the accompanying drawings, an embodiment of the present invention will be described.

Figure 1:
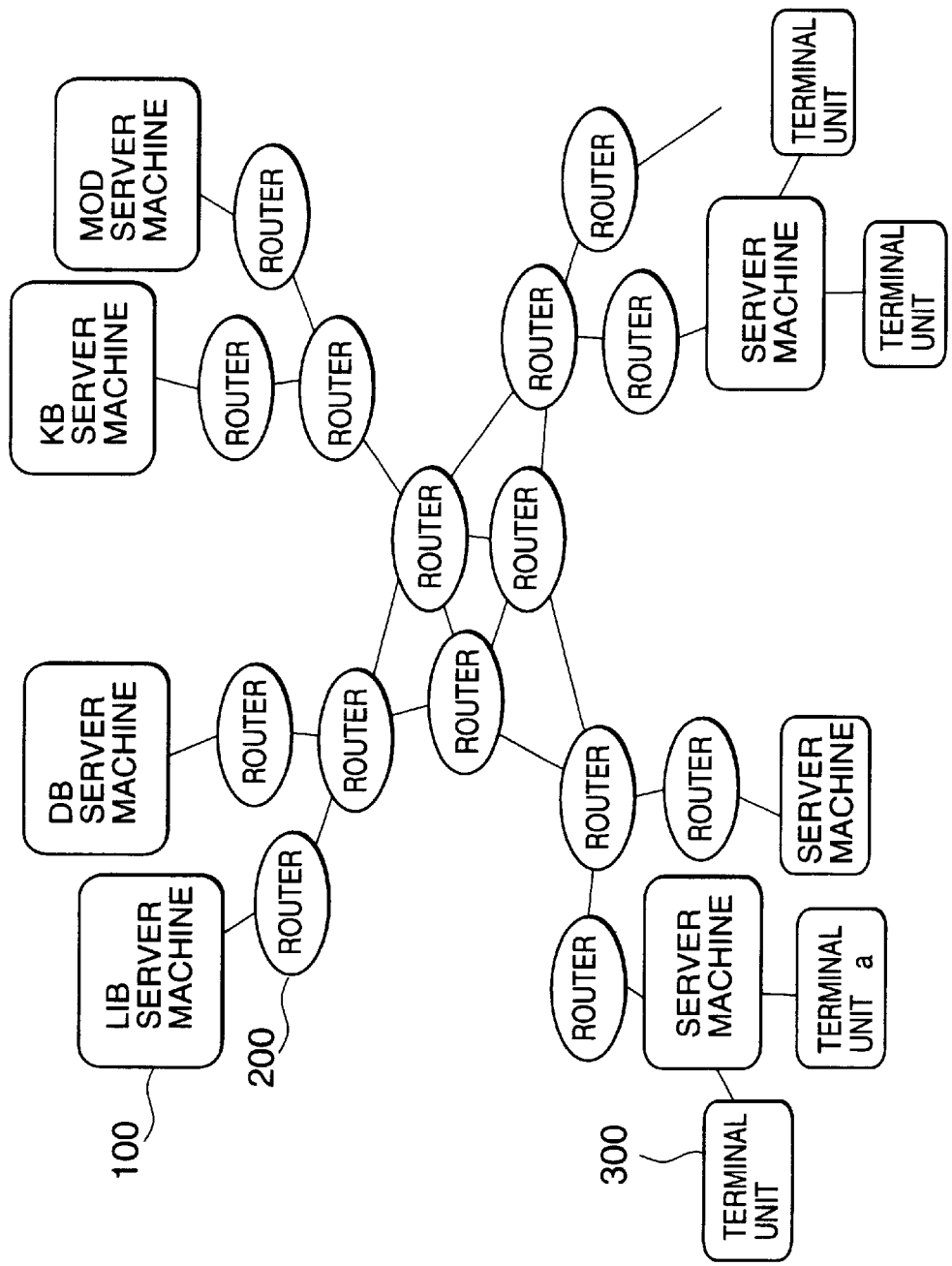
FIG. 1 is a schematic diagram showing an example of a network according to an embodiment of the present invention.

FIG. 1 shows an example of a network according to an embodiment of the present invention. The network has various server machines 100, routers 200, and terminal units 300. Generally, in Internet, Intranet (that is a network used in a company), and so forth, communications are made through dedicated digital lines as well as LAN. These networks are composed of various layers such as ATM switches. In this example, for simplicity, various layers are represented by routers. In the server machines 100, a DB is a server machine with respect to a database. An MDB is a server machine with respect to a multimedia database. A KB is a server machine with respect to a knowledge-base. An LIB is a server machine with respect to a library.

Figure 2:
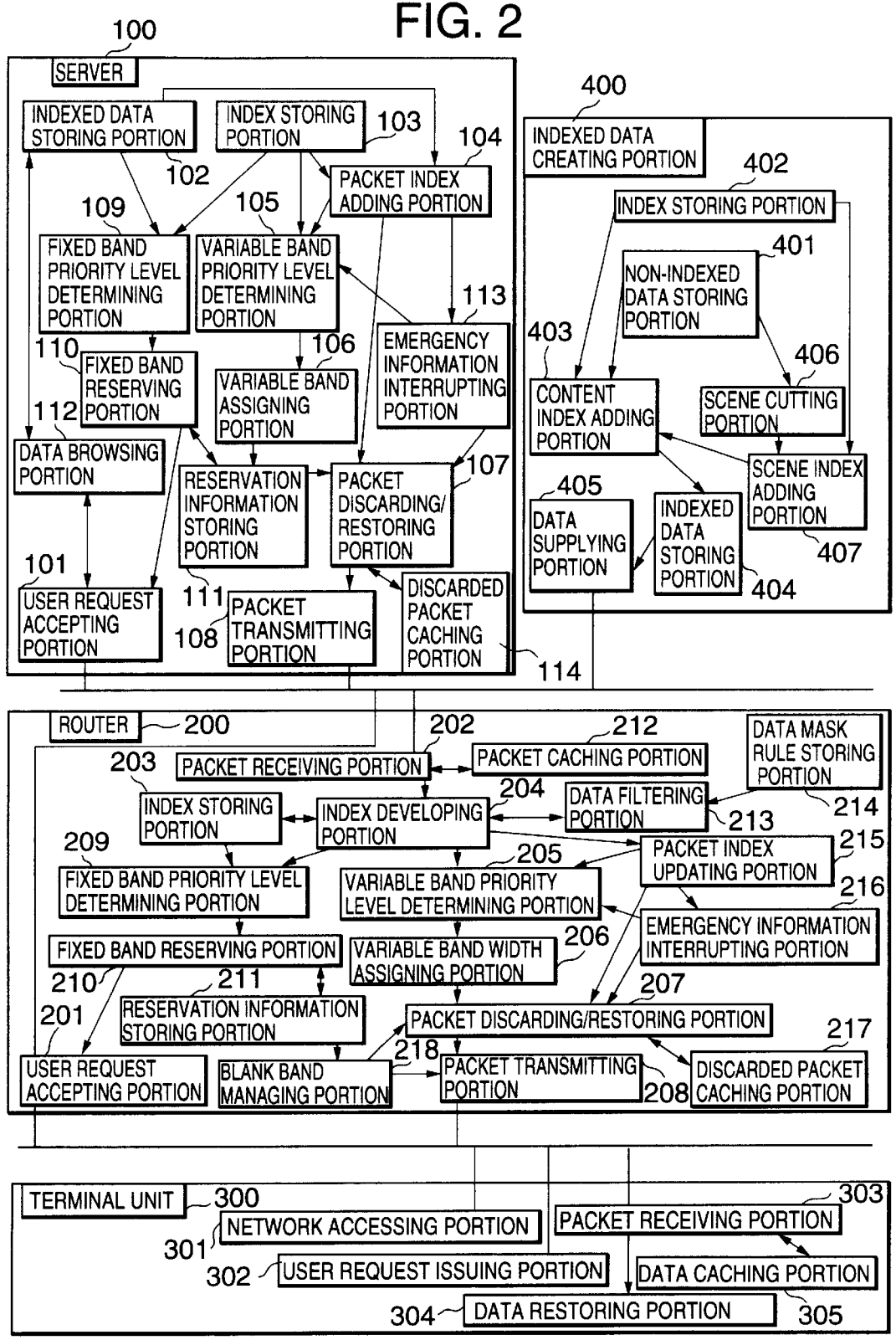
FIG. 2 is a schematic diagram showing the structures of a server, a router, and a terminal unit shown in FIG. 1.

FIG. 2 is a block diagram showing a structure of a communication network using an index in the network environment (shown in FIG. 1) according to an embodiment of the present invention. The "index" is used to determine priority levels in a data selecting state, a negotiating state, a transferring state, a connecting state, and so forth.

The communication network using the index comprises a server 100, a router 200, and a terminal unit 300. The server 100 transmits packets with indexes corresponding to a user's request. The router 200 relays and distributes the packets. The terminal unit 300 receives the packets and restores original data. Alternatively, an indexed data creating portion 400 may be disposed on the network.

The server 100 comprises a user request accepting portion 101, an indexed data storing portion 102, an index storing portion 103, a packet index adding portion 104, a variable band priority level determining portion 105, a variable band assigning portion 106, a packet discarding/restoring portion 107, a packet transmitting portion 108, a fixed band priority level determining portion 109, a fixed band reserving portion 110, and a reservation information storing portion 111. The packet index adding portion 104 adds an index to a packet. The fixed band priority level determining portion 109, the fixed band reserving portion 110, and the reservation information storing portion 111 serve to reserve or secure a band with which packets are transmitted. The server 100 may further comprises a data browsing portion 112 and an emergency information interrupting portion 113. The data browsing portion 112 allows the user to browse data of the server and select desired data. The emergency information interrupting portion 113 allows the user to transmit emergency information in the event of a disaster. The packet discarding/restoring portion 107 restores discarded packets when the server has a sufficient band width. The packet discarding/restoring portion 107 is connected to a discarded packet caching portion 114.

The packet index adding portion 104 in the server 100 divides transmission data into packets and adds to the respective packets indexes received from the index storing portion 103. The variable band priority level determining portion 105 searches an evaluation value corresponding to a relevant index from the index storing portion 103 and determines a priority level of a relevant data flow. The variable band width assigning portion 106 assigns a band to the relevant data flow corresponding to the priority level thereof. The packet discarding/restoring portion 107 selects packets corresponding to the assigned band width and sends the packets to the packet transmitting portion 108. The packet discarding/restoring portion 107 discards the remaining packets or suspends to transmit them. The emergency information interrupting portion 113 detects a packet with an index corresponding to emergency information and sends a data flow or a packet to be transmitted by the highest priority to the variable band priority level determining portion 105 and the packet discarding/restoring portion 107.

The router 200 comprises a user request accepting portion 201, a packet receiving portion 202, an index storing portion 203, an index developing portion 204, a variable band priority level determining portion 205, a variable band assigning portion 206, a packet discarding/restoring portion 207, a packet transmitting portion 208, a fixed band priority level determining portion 209, a fixed band reserving portion 210, and a reservation information storing portion 211. The fixed band priority level determining portion 209, the fixed band reserving portion 210, and the reservation information storing portion 211 serve to secure a band with which packets are transmitted. The router 200 may further comprise a packet caching portion 212, a data filtering portion 213, a data mask rule storing portion 214, a packet index updating portion 215, and an emergency information interrupting portion 216. The packet caching portion 212 temporarily caches received packets or shares packets among data flows. The data filtering portion 213 determines unnecessary data in a network portion downstream of the router (this portion is for example the terminal unit). The data mask rule storing portion 214 stores rules with which the data filtering portion 213 operates. The packet index updating portion 215 updates part of an index. The emergency information interrupting portion 216 allows the user to transmit emergency information in the event of a disaster. The packet discarding/restoring portion 207 restores discarded packets when the router has a sufficient band width. The packet discarding/restoring portion 207 is connected to a discarded packet caching portion 217.

The index developing portion 204 in the router 200 searches an evaluation value from the index storing portion 203 with the index of the received packet and calculates an evaluation value of the relevant data flow. The variable band priority level determining portion 205 determines the priority level of the relevant data flow corresponding to the evaluation value thereof. The variable band width assigning portion 206 assigns a band to the relevant data flow with the priority level thereof. The packet discarding/restoring portion 207 selects packets corresponding to the assigned band width and sends the packets to the packet transmitting portion. The packet discarding/restoring portion 207 discards the remaining packets or suspends to transmit them. The emergency information interrupting portion 201 detects a packet with an index corresponding to emergency information and sends a data flow or a packet to be transmitted by the highest priority to the variable band priority level determining portion 205 and the packet discarding/restoring portion 207.

The terminal unit 300 comprises a network accessing portion 301, a user request issuing portion 302, a packet receiving portion 303, and a data restoring portion 304. The network accessing portion 301 connects the terminal unit to the network and searches desired data. The user request issuing portion 301 issues a transmission request for desired data. The packet receiving portion 303 receives a packet with an index. The data restoring portion 304 restores the received packet to a format that the user desires. To temporarily store the received packet or the decoded data, the terminal unit 300 may further comprise a data caching portion 305. To filter received data, the terminal unit 300 may further comprise a data filtering portion, a data mask rule storing portion, and an index storing portion. To allow the terminal unit to perform a process for referencing an index and an evaluation value thereof, the terminal unit 300 may further comprise an index storing portion.

The indexed data creating portion 400 comprises a non-indexed data storing portion 401, an index storing portion 402, a content index adding portion 403, an indexed data storing portion 404, and a data supplying portion 405. The non-indexed data storing portion 401 stores non-indexed data. The content index adding portion 403 adds an index to the content of the data. The indexed data storing portion 404 stores the indexed data. The data supplying portion 405 supplies indexed data to the server or the like. To add a scene index representing the importance of each scene to data, the indexed data creating portion 400 may further comprise a scene cutting portion 406 and a scene index adding portion 407. The scene cutting portion 406 cuts out a scene from data without a scene index. The scene index adding portion 407 adds a scene index to the cut scene.

In the communication network, a communication band is reserved or secured in the following manner.

The user accesses the server 100 that has desired data through the network accessing portion 301 of the terminal unit 300.

The user request issuing portion 302 of the terminal unit 300 connects the relevant server 100 through the user request accepting portion 201 of the router 200 and the user request accepting portion 101 of the server 100. After checking out the content of the data (summary, size, fee, and so forth), the terminal unit 300 issues a user's request (transmission start time, transmission rate, transmission end time, and so forth) to the router 200 and the server 100.

When the server 100 or the router 200 receives the user's request, the fixed band priority level determining portion 109 or 209 searches an evaluation value of the data from the index storing portion 103 or 203 and determines a priority level for securing a fixed band.

The fixed band reserving portion 110 or 210 searches a reservation situation of the communication band from the reservation information storing portion 111 or 211 and determines whether or not the communication band can be secured in the time zone corresponding to the user's request. When the communication band can be secured, the fixed band reserving portion 110 or 210 informs the user of the availability of the communication band through the user request accepting portion. When the communication band cannot be secured, the fixed band reserving portion 110 or 210 creates an alternative plan and sends it to the user through the user request accepting portion.

When the communication band cannot be secured corresponding to the user's request, the user negotiates with the server 100 and the router 200 through the user request accepting portion.

When the communication band can be secured or the user satisfies the communication band through the negotiation, the user requests the server 100 or the router 200 to secure the communication band and transmit the data through the user request accepting portion.

Figure 3:
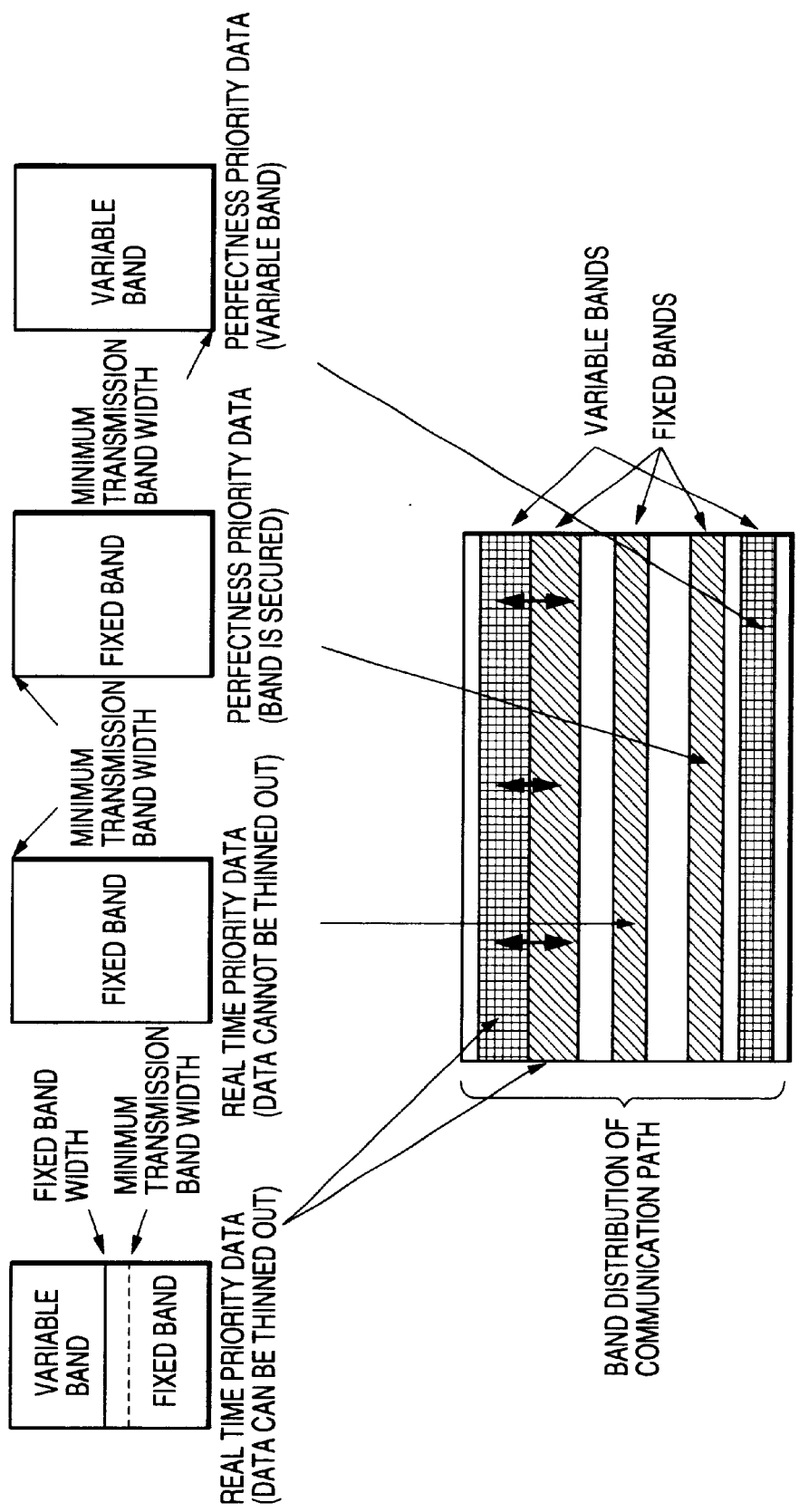
FIG. 3 is a schematic diagram showing a dividing method of a communication band of a communication network using an index and a schematic diagram showing a communication band assigning method for each data stream corresponding to the dividing method.

FIG. 3 shows an example of a dividing method for a communication band in a communication network using an index and an example of a method for assigning the divided communication bands to data flows corresponding to communication requests.

In this case, a fixed band represents a communication band that cannot be decreased. A practical value of a fixed band is referred to as a fixed band width. A fixed band width is assigned when a data stream is are scheduled before a communication is started. A variable band is a communication band other than a fixed band. The variable band is assigned to a data flow corresponding to a priority level thereof. The minimum transmission band width is a band width of which a particular data stream can be sufficiently transmitted on real time basis.

As the method for dividing a communication band, there are several categories corresponding to characteristics of data. In this embodiment, four categories will be described.

Real time priority data (data can be thinned out)

In data that should be transmitted on real time basis, packets can be thinned out to some extent. On the receive side, data can be restored to a quality that the user can compromise. Although there is an engineering restriction, the quality of data depends on the user.

This category includes general moving picture data and audio data (including data sent through a telephone line). A communication band is secured as a fixed band and a variable band. The ratio of the fixed band and the thin-out ratio of the variable band can be varied corresponding to the content of the transmission data, a scene, and the importance of the data. The communication band width (transmission rate) depends on the sum of the fixed band and the variable band that varies corresponding to other data flows.

Real time priority data (data cannot be thinned out)

This category includes data that should be handled on real time basis and that cannot be thinned out.

Examples of this category are moving picture data with high picture resolution and control data that should be handled on real time basis.

In this category, a sufficient fixed band is used so that data can be sufficiently handled on real time basis. The band width (transmission rate) depends on the content of data.

Perfectness priority data (band is secured)

This category includes data whose perfectness is important, that should be transmitted corresponding to a schedule, and whose transmission completion time should be assured. An example of this category is term data (daily data, monthly data, yearly data, and so forth) collected in company activities. Such data should be transmitted from branches of a company to the main office thereof. A sufficient communication band should be assigned so that data can be transmitted on schedule. The communication band width (transmission rate) depends on the amount of data and transmission time thereof.

Perfectness priority data (variable band)

This category includes data that requires the perfectness, not the transmission end time on schedule. An example of this category is e-mail exchanged among individuals. A variable band is used. The communication band width (transmission rate) depends on other data flows. In TCP/IP and so forth based on the conventional best effort system, the bands of all data flows vary without priority.

FIG. 4 shows an example of an index table that lists types of data publicized in the network. When data of emergency information is designated a special priority level, such data should be handled by only a predetermined person such as a network administrator or a special organization.

In FIG. 4, evaluation values are designated corresponding to picture data, sound data, text data, and so forth. Alternatively, evaluation values may be designated regardless of such data. In addition, evaluation values may be designated corresponding to other types. When the priority level of a communication request is distinguished from the priority level of the assignment of a communication band, the evaluation value of the connection request may be distinguished from the evaluation value of the communication data.

A scene index shown in FIG. 5 may be designated. This index is effective for flexibly coordinating a communication band in the event that the same data has portions whose priority levels are different. As the relation between the index shown in FIG. 4 and the index shown in FIG. 5, the former is used as basic evaluation values for securing a communication band and the latter is used as evaluation values for modifying the evaluation values of the former. For example, the evaluation values of a climax scene and a non-climax scene may differ.

Figure 6:
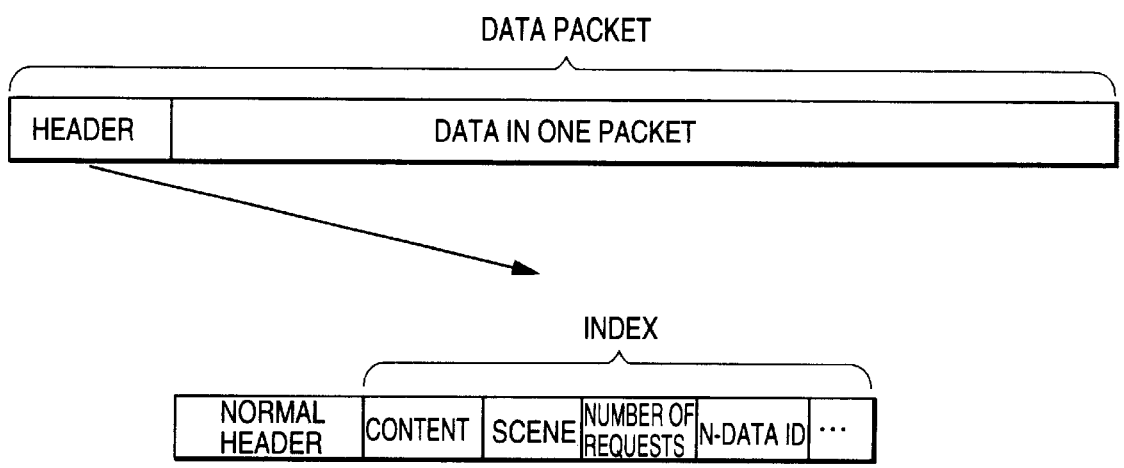
FIG. 6 is a schematic diagram showing an example of the structure of a data packet received by a server, a router, and a terminal unit in a communication using an index.

FIG. 6 shows an example of the structure of a data packet received by a server, a router, a terminal unit, and so forth in a communication using an index. In this example, an index is added to a header portion of a data packet. The index may contain a content portion, a scene portion, a request number portion, and so forth. The content portion includes the content index shown in FIG. 4. The scene portion includes the scene index shown in FIG. 5. The scene index represents the importance of the data. The request number portion represents the number of requests that have been issued at that time. To locate data to be transmitted corresponding to the content, the index may contain an ID portion (in-data ID) that represents the position of data to be transmitted.

With the request number portion, each router and each server can process packets with higher request numbers by higher priority. This is because a plurality of requests can be handled with one data flow until a relevant router copies data and distributes it. In the case that transmission data can be identified corresponding to the content index, when data corresponding to two requests is transmitted at a very short interval, the data can be sent from a cache. In this case, the two requests may be counted as the same request. With the in-data ID portion, the data flow can be shared by the two requests. In addition, a data flow of a request with a large fixed band width can contain a data flow of a request with a small fixed band until a relevant router distributes the data flows. When a packet in a cache of a router contains data corresponding to a user's request and the quality satisfies the user's request (namely, data is transmitted with a fixed band width higher than the user's request), the router can operate instead of a relevant server.

Figure 7:
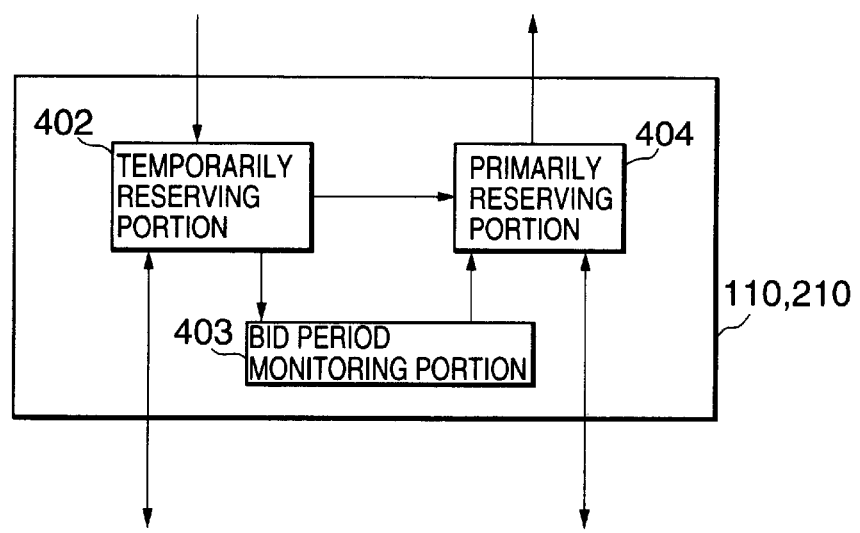
FIG. 7 is a block diagram showing an example of the structure of a fixed band reserving portion that is a structural portion of a server and a router of the network according to an embodiment of the present invention.
Figure 8:
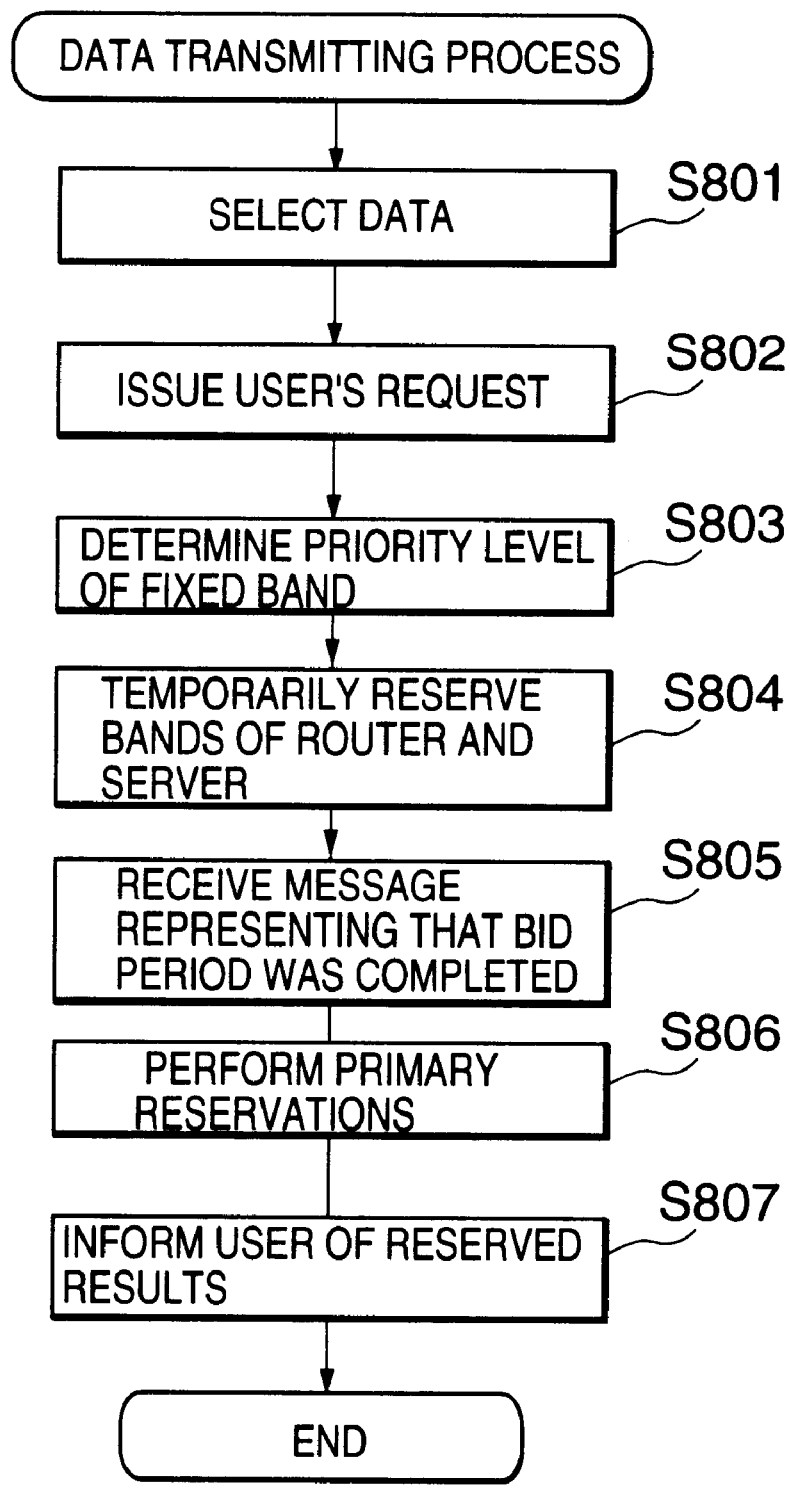
FIG. 8 is a flow chart showing a data transmission procedure in a communication using packets with indexes.

FIG. 7 is a block diagram showing the structures of the fixed band reserving portions 110 and 210 of the server 100 and the router 200 shown in FIG. 2. FIG. 8 is a flow chart showing a fixed band reserving process.

1. Selecting data (at step S801)

The user selects desired data using a WWW browser, a directory searching system of a relevant network, or the like. Thus, the relevant server sends information of the desired data (index, size, transmission time, band width of the data transmission, fee, and so forth). For example, the user accesses a multimedia database with a browser that runs on the terminal unit and selects movie data "Jurassic Wars". The server sends information with respect to "Jurassic Wars" as shown in FIG. 9 to the user. In FIG. 9, the full transmission band width represents a band width required for transmitting data in full size.

Alternatively, the required fixed band width of the user's request field may be a band of the minimum transmission band width+$\alpha$ as a default fixed band.

2. Issuing user's request (at step S802)

The user checks out the information received from the server and options that he or she has set and issues a request that contains transmission start date and time and a user's request column (in which the user sets options). For example, the user can designate the transmission start date and time and changes the default fixed band width (25 kbytes) to 35 kbytes as shown in FIG. 10. In this case, the user can select the fixed band width in the range from the minimum transmission band width (as the lower limit) to the full transmission band width (at the upper limit).

When the server sends pay data to the user, it may send charging information that represents a license fee for data retrieval and communication amount. When data is charged corresponding to the communication amount, it is preferable to separately charge a fixed band and a variable band.

3. Determining priority level of fixed band (at step S803)

The router and the server determine priority levels of band for temporary reservations of data corresponding to users' requests with Formula 1. Each evaluation value is searched from the index tables shown in FIGS. 4 and 5.

In the case of data containing picture data, sound data, and text data:

$$e_j = e_{pj} + e_{sj} + e_{cj}$$

$$p_j = e_j / \Sigma e_i \qquad \text{(Formula 1)}$$

where $e_{pj}$ is an evaluation value of picture data of a particular flow j; $e_{sj}$ is an evaluation value of sound data of a particular flow j; $e_{cj}$ is an evaluation value of text data of a particular flow j; $e_j$ is an evaluation value of a particular flow j; and $p_j$ is a priority level.

4. Temporarily reserving bands of router and server (at step S804)

The terminal unit, the server, and the router therebetween temporarily reserve a communication path (data flow) after the transmission start date and time until the transmission is completed. At this point, the temporarily reserving portion 402 schedules communication requests in a predetermined time period (referred to as a bid period) corresponding to evaluation values (priority levels) of the information of the communication requests and temporarily reserves the communication resources. Thus, when the temporarily reserving portion 402 receives a plurality of communication requests in a bid period, whenever it receives a request with a higher evaluation value (priority level), the service start time of a communication request with a lower evaluation value (priority level) may be delayed.

5. Receiving information representing bid period was completed (at step S805)

The bid period monitoring portion 403 periodically informs the primarily reserving portion 404 of the completion of the bid period. Alternatively, the bid period monitoring portion 403 informs the primarily reserving portion 404 of the completion of the bid period in a predetermined time period after the reception of the bid period from the temporarily reserving portion 402 (at step S805).

6. Performing primary reservations (at step S806)

The primarily reserving portion 404 registers the temporary reservations of the communication resources as primary reservations (at step S806).

7. Informing reserved results (at step S807)

The primarily reserving portion 404 informs the user of the service start time and the service end time as the reserved results of the communication resources.

There are several scheduling methods for selecting a bid period and performing a temporary reservation and a primary reservation. In the following example, a number added to data represents an evaluation value (priority level). In this example, a larger number represents A higher priority level.

Alternatively, communication resources may be assigned in the order of earlier requests rather than using a bid period. In this case, the priority levels of services are not considered. In the following example, however, priority levels are considered.

Bidding method 1. Requests are scheduled for temporary reservations in a constant bid period (see FIG. 11).

Bidding method 2. Requests are scheduled for primary reservations after the completion of a constant bid period (see FIG. 12).

Bidding method 3. The length of a bid period differs in each request. Requests are scheduled for temporary reservations in respective bid periods (see FIG. 13).

Figure 14A:
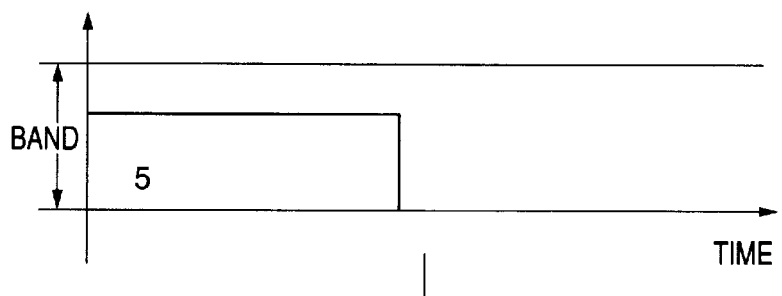
FIG. 14A, FIG. 14B and FIG. 14C are schematic diagrams showing an example of a process for creating a schedule table of which fixed bands are chronologically secured.
Figure 14B:
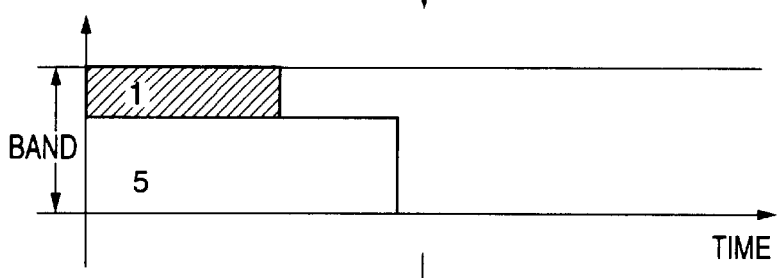
Figure 14C:
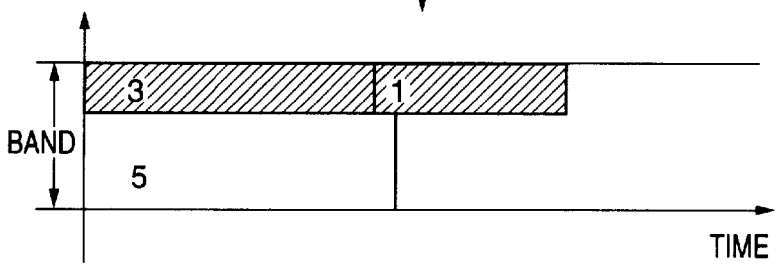

In the cases of the bidding methods 1 and 3, the respective time charts of the fixed bands vary as shown in FIGS. 14A, 14B, and 14C. FIGS. 14A, 14B, and 14C show chronological band occupying situations of communication path securing request packets with higher priority levels. The communication path securing request packets are denoted by communication requests a, b, and c with priority levels 5, 1, and 3, respectively. In the following examples, for simplicity, the lengths of individual bid periods are the same. Alternatively, bid periods may overlap.

[Bidding Method 1]

First of all, the bidding method 1 will be described.

The bid period monitoring portion 403 informs the temporarily reserving portion 402 of the start of the bid period. In this case, the length of the bid period is constant.

The first bid period is referred to as a bid period 1. In the bid period 1, the case of which three communication requests arrive will be described. This situation is shown in FIG. 11. The fixed band priority level determining portion 109, 209, or the like obtains information of the fixed band width, transmission time, priority level, and so forth necessary for securing the communication resources for the communication requests.

The temporarily reserving portion 402 temporarily reserves the communication resources for the communication request a that has arrived at first in the bid period 1. After the temporarily reserving portion 402 has temporarily reserved the communication resources for the communication request a, the reservation information storing portion 111 or 211 registers temporary reservation information of the communication resources. The temporary reservation information contains transmission start time, transmission end time, required band width, and data representing a temporary reservation. The temporary reservation information is stored in the format of a database.

Since the priority level of the communication request b that has arrived after the communication request a is lower than the priority level of the communication request a, the communication request b does not affect the temporary reservation of the communication resources of the communication request a. The temporarily reserving portion 402 temporarily reserves the communication resources for the communication request b in a blank band in the same manner as described above.

Since the priority level of the communication request c that has arrived at last in the bid period 1 is higher than the priority level of the communication request b, the temporarily reserving portion 402 requests the reservation information storing portion 111 or 211 to release the communication resource assigned to the communication request b. Thereafter, the temporarily reserving portion 402 temporarily reserves the communication resources for the communication request c. Last, the temporarily reserving portion 402 temporarily reserves the communication request b with the lower priority level. The temporary information storing portion 111 or 211 registers the results as temporary reservation information.

FIGS. 14A, 14B, and 14C show situations of which the required band width, transmission start time, and transmission end time of each of the transmission requests are temporarily reserved.

The bid period monitoring portion 403 informs the primarily reserving portion 404 of the completion of the bid period. The primarily reserving portion 404 registers the resource information that has been temporarily reserved in the reservation information storing portion 111 or 211 as primary reservation information thereto. The structure of the primary reservation information is the same as the structure of the temporary reservation information except that it contains data that represents a primary reservation.

[Bidding Method 2]

Next, the bidding method 2 will be described. In the bidding method 2, requests are scheduled after the completion of a bid period. In other words, requests are not scheduled whenever they are received. Thus, in the bidding method 2, the load of the server or router is reduced.

Figure 12:
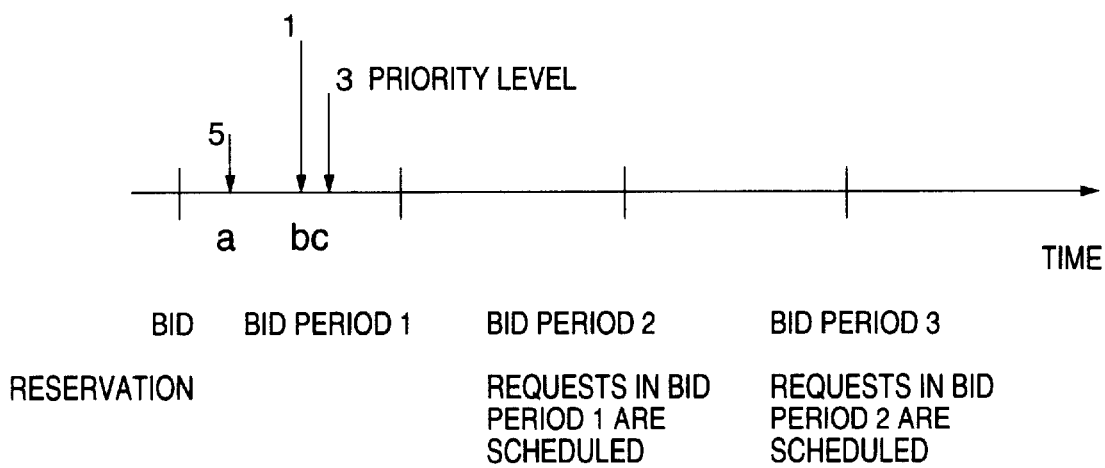
FIG. 12 is a schematic diagram showing an example of a bidding method 2 of which the length of a bid period is constant and data flows are scheduled for primary reservations after the bid period as a method for assigning communication resources to the data flows.

As with the bidding method 1, three communication requests a, b, and c arrive as shown in FIG. 12. The length of the bid period in the bidding method 2 is the same as the length of the bid period in the bidding method 1. The bid period monitoring portion 403 monitors the start time and end time of the bid period.

Fixed band information of a communication request that arrives until the bid period 1 completes is extracted and sent to the temporarily reserving portion 402. When the bid period monitoring portion 403 informs the temporarily reserving portion 402 of the completion of the bid period 1, the temporarily reserving portion 402 schedules the communication resources for the communication requests in the next bid period (bid period 2). The communication resources are assigned in the order of higher priority levels of the communication requests. In the example shown in FIG. 12, blank bands are assigned in the order of the communication requests a, c, and b. The scheduled results are sent to the primarily reserving portion 404. The primarily reserving portion 404 registers the primary reservation information to the reservation information storing portion 111 or 211.

[Bidding Method 3]

Next, the bidding method 3 will be described. In the bidding method 3, bid periods are varied corresponding to evaluation values (priority levels) of individual communication requests.

Figure 13:
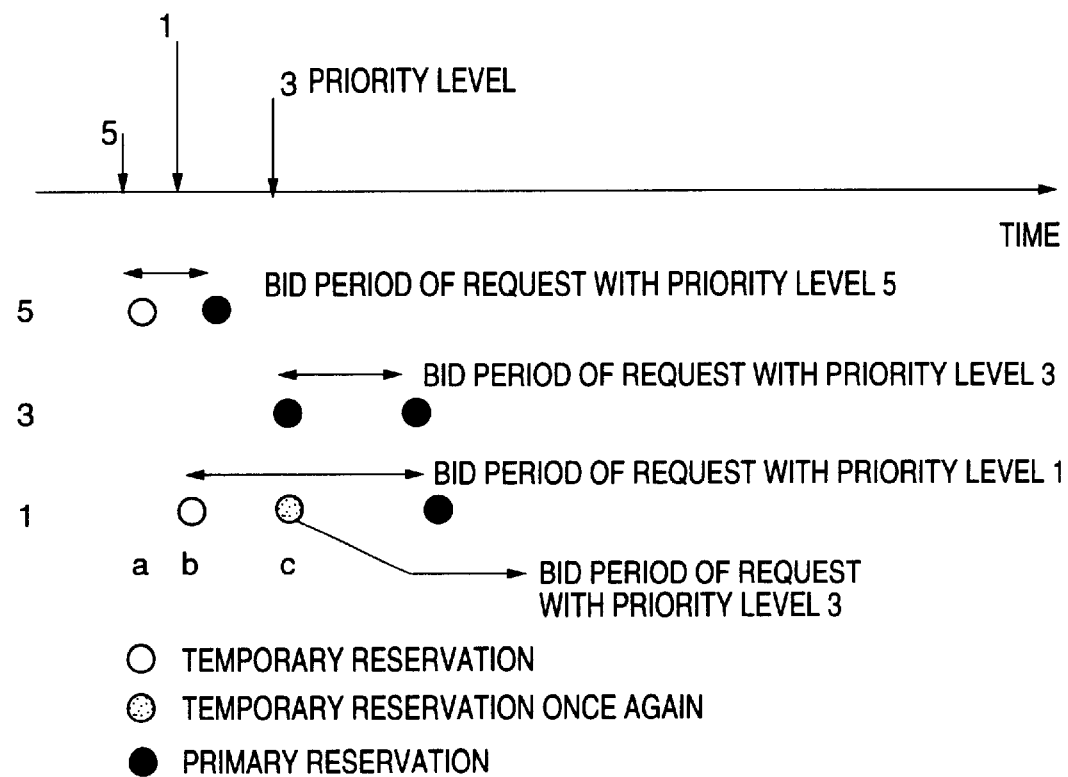
FIG. 13 is a schematic diagram showing an example of a bidding method 3 of which the lengths of bid periods depend on priority levels of communication requests and the data flows are scheduled for temporary reservations in the bid periods as a method for assigning communication resources to the data flows.

As with the bidding method 1, three communication requests a, b, and c arrive as shown in FIG. 13. The bid period monitoring portion 403 monitors bid periods.

The length of a bid period depends on the priority level of a communication request. In this example, the length of a bid period is reversely proportional to the priority level of a communication request. Thus, the schedules of communication resources for communication requests are not affected by other communication requests that have arrived later. When the communication request a arrives, fixed band information thereof is extracted. The temporarily reserving portion 402 temporarily reserves the communication request a. The reservation information storing portion 111 or 211 registers the communication request a as temporary reservation information. In addition, the temporarily reserving portion 402 informs the bid period monitoring portion 403 of the information of the priority level contained in the temporary reservation information. The bid period monitoring portion 403 determines the length of the bid period. As long as a communication request with a higher priority level than the priority level of the communication request a in the bid period of the communication request a, the schedule of the communication resources is not affected by other communication requests. In this example, in the bid period of the communication request a, only the communication request b with a lower priority level than the priority level of the communication request a arrives. After the bid period monitoring portion 403 has informed the primarily reserving portion 404 of the completion of the bid period of the communication request a, the primarily reserving portion 404 primarily reserves the communication request a. Thereafter, the reservation information storing portion 111 or 211 registers the primary reservation information.

The bid period monitoring portion 403 determines the bid period of the communication request b that has arrived in the bid period of the communication request a corresponding to the priority level of the communication request b. Since the priority level of the communication request b is lower than the priority level of the communication request a, the bid period monitoring portion 403 designates a longer bid period for the communication request b than the bid period of the communication request a. When the communication request c arrives, the bid period monitoring portion 403 informs the reservation information storing portion 111 or 211 that the communication request c has arrived in the bid period of the communication request b. The bid period monitoring portion 403 knows that the priority level of the extracted communication request c is higher than the priority level of the communication request b that has been temporarily reserved. The bid period monitoring portion 403 requests the reservation information storing portion 111 or 211 to release the temporary reservation information of the communication request b. Thereafter, the temporarily reserving portion 402 schedules the communication resources for the communication requests b and c. The reservation information storing portion 111 or 211 registers the temporary reservation information of the communication requests b and c. As long as a communication request with a higher priority level arrives in the bid periods of the communication requests b and c, the bid period monitoring portion 403 informs the primarily reserving portion 404 of the completion of the bid periods. The primarily reserving portion 404 primarily reserves the communications requests b and c. In this example, the bid period monitoring portion 403 informs the primarily reserving portion 404 of the completion of the communication request c before the completion of the communication request b. The reservation information storing portion 111 or 211 registers the temporary reservation information of the communication request c as primary reservation information. Thereafter, the bid period monitoring portion 403 informs the reservation information storing portion 111 or 211 of the completion of the bid period of the communication request b. The reservation information storing portion 111 or 211 stores the temporary reservation information of the communication request b as primary reservation information.

[Bidding Method 4]

In the bidding method 4, as types of fixed bands, "minimum transmission band" and "fixed band added by user request" are considered. Communication resources are assigned with two types of fixed bands.

Figure 15:
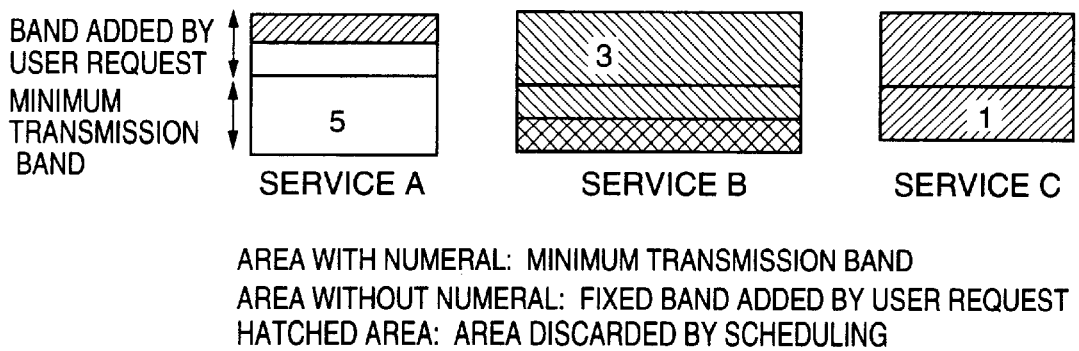
FIG. 15 is a schematic diagram showing an example of a scheduling process for fixed bands corresponding to a bidding method 4.

The "minimum transmission band" is a band that cannot be decreased no more and that should be secured. The "fixed band added by user request" is a band that can be decreased in a busy situation. A fixed band does not vary during a service period unlike with a variable band that varies time by time depending on a loaded situation of the server or router. FIG. 15 shows an example of the structure of fixed bands.

Figure 16:
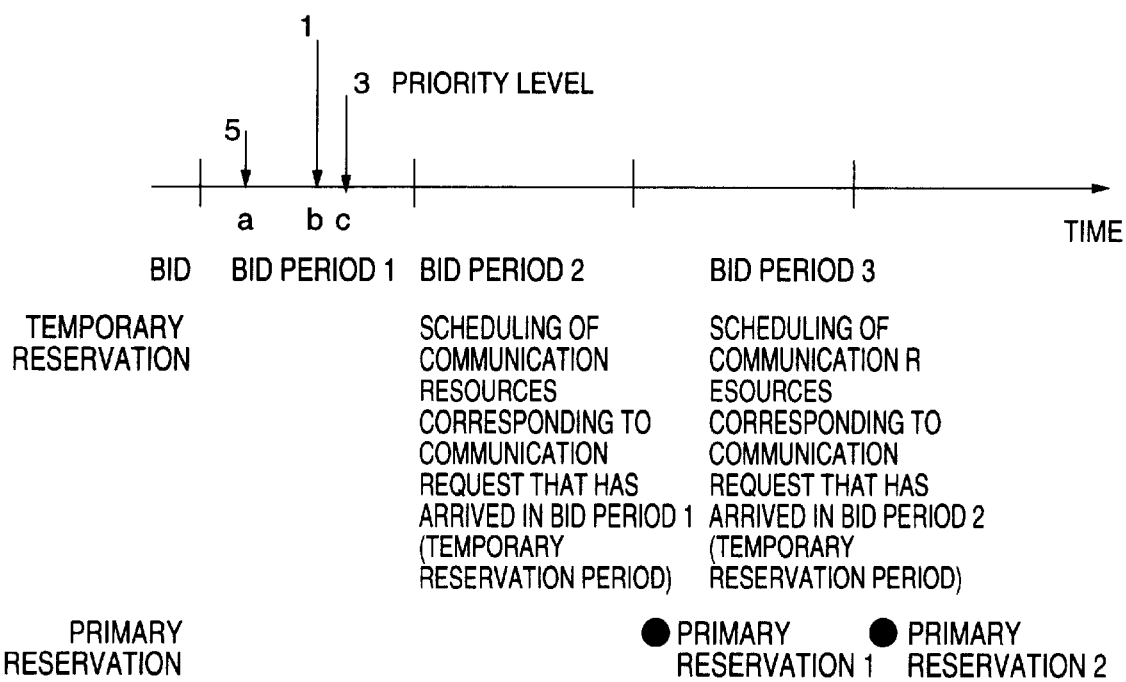
FIG. 16 is a schematic diagram showing an example of a scheduling process for variable bands.
Figure 17:
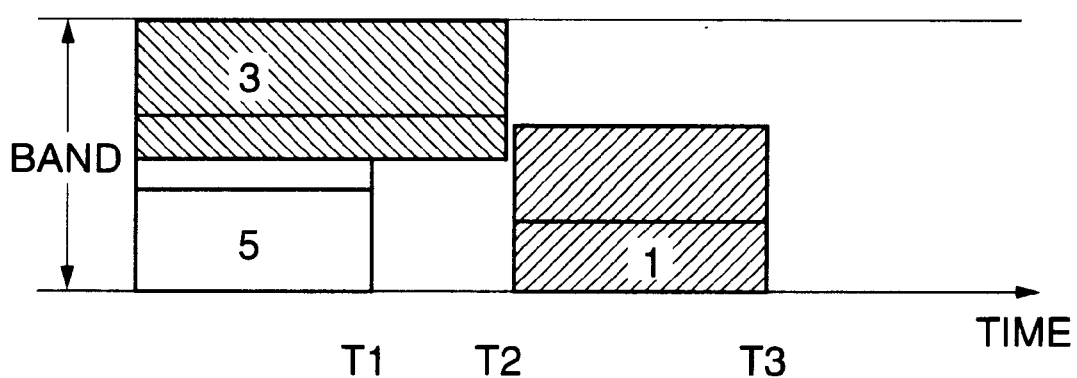
FIG. 17 is a schematic diagram showing an example of a scheduled result of fixed bands according to the bidding method 4.

Next, with reference to FIGS. 16 and 17, the bidding method 4 will be described.

In this example, it is assumed that the lengths of bid periods are constant. After the bid period monitoring portion 403 has informed the temporarily reserving portion 402 of the completion of the bid period 1, the temporarily reserving portion 402 temporarily reserves a communication request that has arrived in the bid period 1 in the next bid period 2. The communication resources are scheduled in the order of higher priority levels of the communication requests a, b, and c. However, bands may not be assigned to all the communication requests. Thus, considering users' service requests, bands are scheduled for the communication requests with the following assumptions.

Although the communication requests a and b require immediate services, they allow the server or router to decrease bands added by user requests.

Although the communication request c allows service start time to be delayed, it does not allow the server or router to decrease the band added by user request.

The temporarily reserving portion 402 schedules communication resources for the communication requests a and b. At this point, the temporarily reserving portion 402 cannot assign the communication resources to all the two communication requests a and b. Thus, the temporarily reserving portion 402 divides the "band added by user" corresponding to the priority levels of the communication requests a and b (in this example, the ratio of 5 to 3).

Next, the temporarily reserving portion 402 assigns the communication resources from the earliest time at which data corresponding to the remaining communication request c can be transmitted. After the temporarily reserving portion 402 has scheduled the communication resources for all the communication requests, it informs the primarily reserving portion 404 of the scheduled results. The primarily reserving portion 404 registers the schedule data as primary reservation information to the reservation information storing portion 111 or 211.

Figure 18:
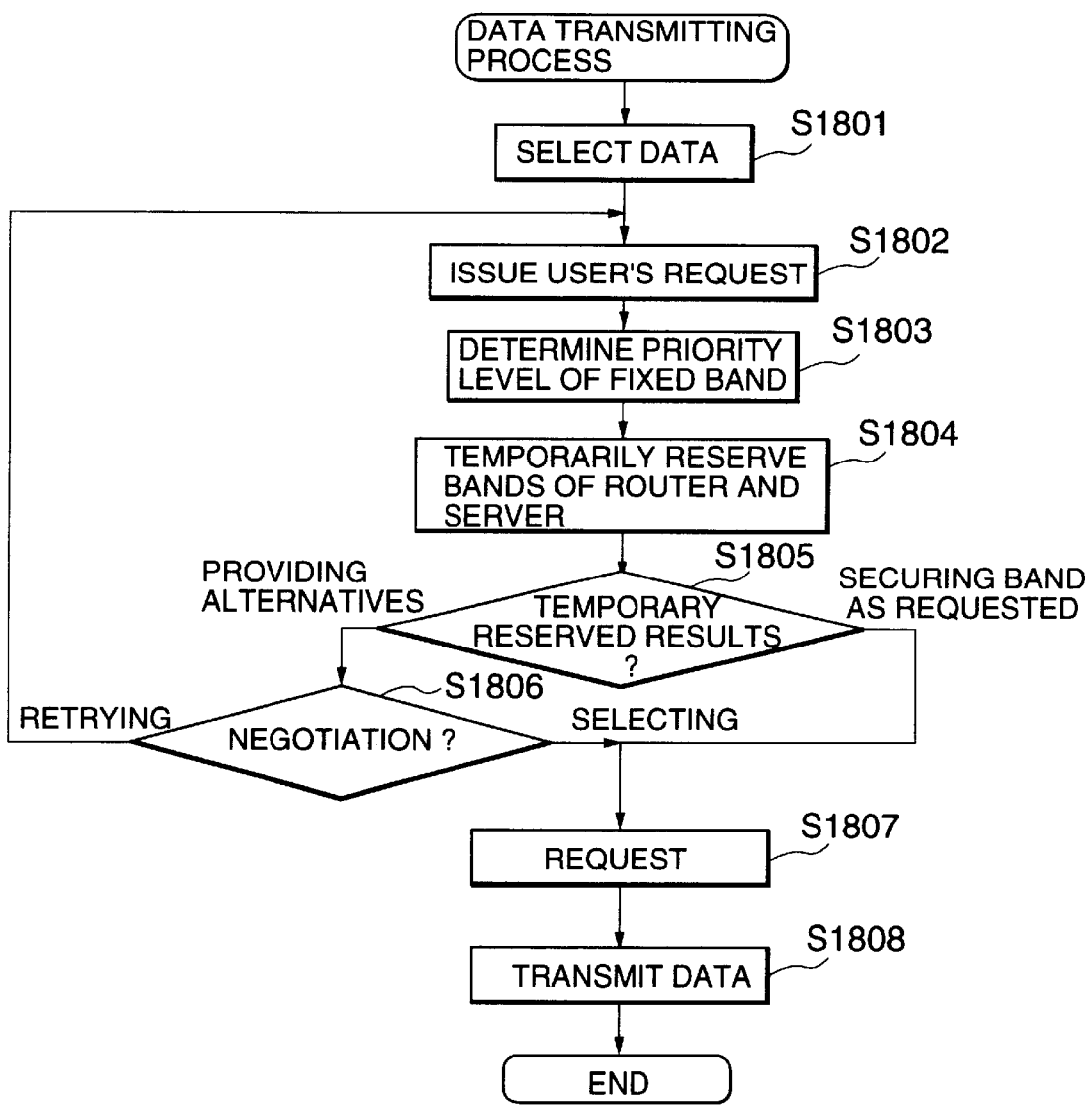
FIG. 18 is a flow chart showing another data transmitting process in a communication using packets with indexes.

Alternatively, without bid periods, the communication resources may be scheduled for communication requests in a process as shown in FIG. 18.

The process shown in FIG. 18 is the same as the process shown in FIG. 8 except for the following steps.

4. Temporarily reserving of bands of router or server (at steps S1804 and S1805)

The terminal unit, the server, and router therebetween temporarily reserve a communication path (data flow) after transmission start date and time until the transmission is completed. At this point, a communication path that secures a fixed band for a request is searched and communication resources are scheduled for communication requests. Thus, a communication with the minimum quality level is assured after the reserved transmission start date and time.

When a band corresponding to a user's request cannot be secured, the server or router provides the user with alternatives that satisfy the user's request. Alternatives are as follows.

Alternative 1: As shown in FIG. 19, data is transmitted from time closest to the request so that the transmission start time and a band that is higher than minimum fixed band width are secured.

Alternative 2: As shown in FIG. 20, data is transmitted from a time zone closest to the request so that the fixed band width corresponding to the user's request is secured.

5. Negotiation (at step S1806)

When the user satisfies the received temporary reservation results (including the alternatives), the flow advances to step S1807. When the user does not satisfy the temporary reservation results or alternatives, he or she changes the request and issues the request.

The user accepts one of the alternatives.

The user issues a request with another option.

The user searches another server with the same data.

The user gives up the request and searches another data.

6. Requesting (at step S1807)

When there is a requested schedule or compromise alternative, the user requests the server or router to transmit the data.

7. Transmitting data (at step S1808)

The router transmits data with an index in a process shown in FIG. 21.

7-1 At step S2101, the blank band managing portion 218 references the reservation information storing portion 211, obtains the number of current data flows and bands thereof, and calculates available variable bands.

7-2 At step S2102, the variable band priority level determining portion 205 obtains the evaluation value of each data stream with the index of the received packet thereof.

7-3 At step S2103, the variable band priority level determining portion 205 calculates the priority levels corresponding to the evaluation values obtained at step S2102. The variable band assigning portion 206 determines the variable bands to be assigned to the data streams corresponding to the variable bands obtained at step S2101.

7-4 At step S2104, the variable band assigning portion 206 references the reservation information storing portion 211 and determines the number of packets assigned to fixed bands and variable bands.

7-5 At step S2105, the variable band assigning portion 206 determines whether or not all packets can be transmitted in the variable band widths obtained at steps S2103 and S2104.

7-6 When the determined result at step S2105 is No (namely, the band is insufficient), the flow advances to step S2106. At step S2106, the packet discarding/restoring portion 207 thins out packets and determines packets to be transmitted. At step S2107, the packet discarding/restoring portion 207 causes the packet transmitting portion 208 to transmit the packets. At step S2108, the packet discarding/restoring portion 207 sends the discarded packets to the discarded packet caching portion 217. The discarded packet caching portion 217 temporarily stores the discarded packets. At step S2109, the packet discarding/restoring portion 207 determines whether or not data can be transmitted through an alternative path. When the determined result at step S2109 is Yes, the flow advances to step S2110. At step S2110, the packets are received from the discarded packet caching portion 217 and transmitted through the alternative path.

7-7 When the determined result at step S2105 is Yes (namely, sufficient band), the flow advances to step S2111. At step S2111, the packet discarding/restoring portion 207 references the discarded packet caching portion 217 and extracts from the discarded packet caching portion 217 packets that can be transmitted. At step S2112, the packet discarding/restoring portion 207 causes the packet transmitting portion 208 to transmit the resultant packets.

7-8 The above-described process is repeated at a predetermined interval and a variable band is reassigned. The time interval can be designated independent from the scheduling interval (bid period) of fixed bands. To prevent a fixed band from being unmatched with a variable band (such as a situation of which after a new service starts, a variable band is not reassigned), the time interval may be 1/n of the bid period (where n is any integer).

Next, with reference to FIGS. 22 and 23, an example of an assigning process of the variable band assigning portion 502 will be described.

Figure 22:
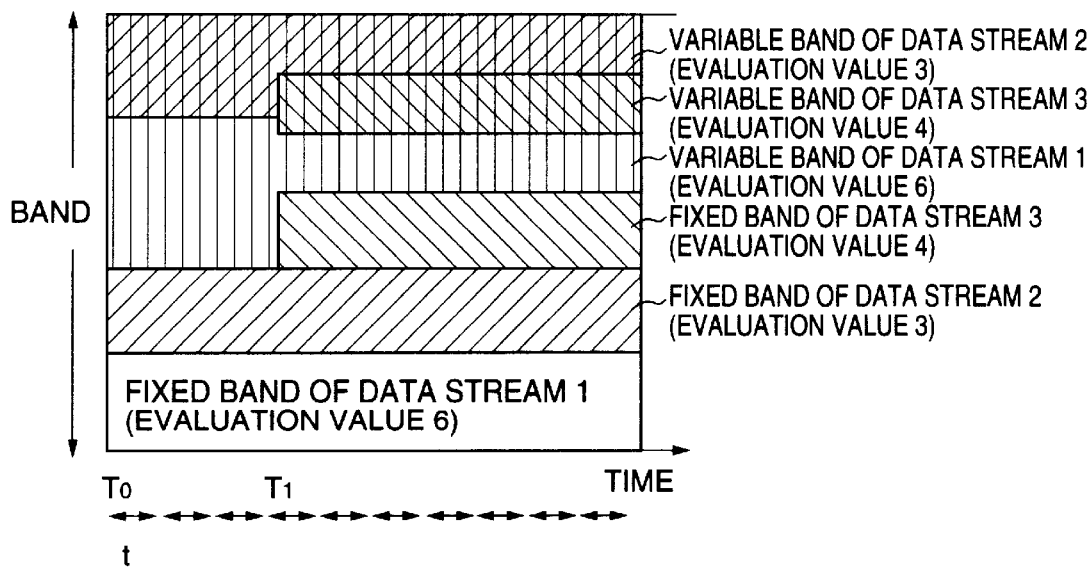
FIG. 22 is a schematic diagram showing an example of a scheduling process for variable bands.
Figure 23:
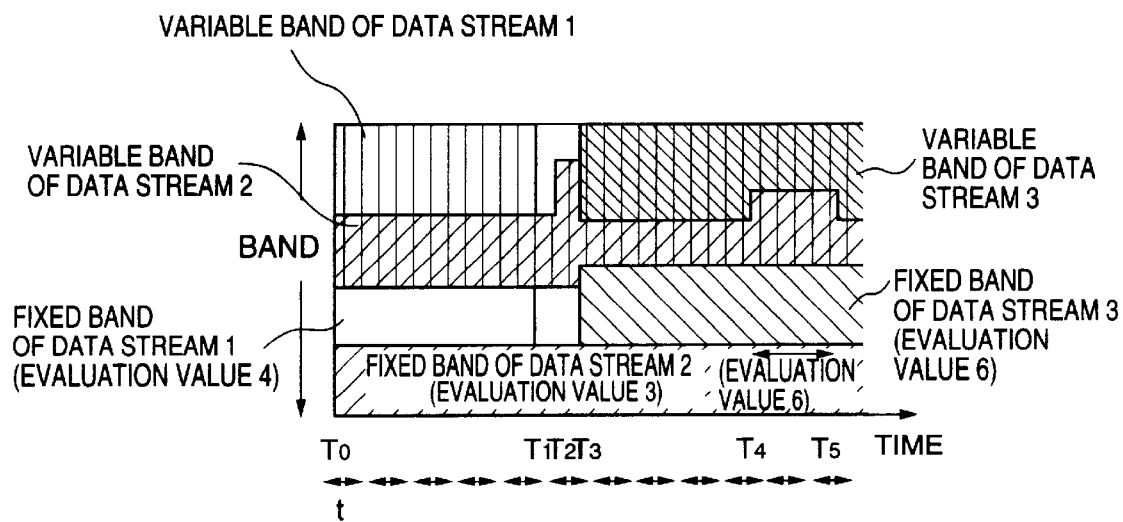
FIG. 23 is a schematic diagram showing an example of a scheduling process for variable bands.

In FIGS. 22 and 23, fixed bands and variable bands for the data streams 1, 2, and 3 are separately represented. Alternatively, the total band of these bands can be represented as one data flow. Of course, fixed bands and variable bands can be secured for different data flows.

In FIG. 22, three types of data streams 1, 2, and 3 are transmitted. Since the data streams 1 and 2 are transmitted at first, the remaining bands other than the bands for the data streams 1 and 2 become variable bands. Variable bands are assigned to the individual data streams corresponding to the ratio of the priority levels calculated corresponding to evaluation values of data streams. In this case, the evaluation values can be treated as priority levels. Since the evaluation values of the data streams 1 and 2 are 6 and 3, respectively, the ratio of the priority levels becomes 2 to 1. Thus, the entire variable bands are divided with the ratio of 2 to 1. The assignment of the variable bands is reconsidered every time period t.

At time T1, the transmission of the data stream 3 is started. Since the data stream 3 uses a fixed band, the variable bands decrease. Since time T1 is n × time period t (where n is any integer), the assignment of the variable bands is reconsidered. Since the evaluation values of the data streams 1, 2, and 3 are 6, 3, and 4, respectively, the ratio of the variable bands assigned thereto becomes 6 to 3 to 4 corresponding to the ratio of the priority levels thereof.

FIG. 23 shows an example of which an evaluation value of a data stream varies. First, data streams 1 and 2 are transmitted. At time T1 (T1≠n1t, where n1 is any integer), the transmission of the data stream 1 is completed. At this point, since the data transmission end time T1 is not n × time period t (where n is any integer), the reassignment of the band is not performed. At time T2 that is n2 × time period t (T2=n2t, where n2 is any integer), the reassignment of the band is performed. In the variable band for the data stream 2, the band for the data stream 1 is increased.

At time T3 (T3=n3t, where n3 is any integer), when the transmission of the data stream 3 is started, the ratio of the variable bands for the data streams 2 and 3 becomes 1 to 2. At time T4 (T4=n4t, where n4 is any integer), it is assumed that since the scene index of the data stream 2 is "climax of movie", the evaluation value thereof is temporarily increased to 6. In this case, when the variable bands are reassigned, since the evaluation values of the data streams 2 and 3 become 6, the variable band for the data stream 2 is increased. Consequently, the variable band for the data stream 3 is decreased. Thus, the ratio of the variable bands for the data streams 2 and 3 becomes 1 to 1. After the "climax of movie" has completed and thereby the evaluation value has been restored, the assignment of the band is restored.

In the example shown in FIG. 22, since the transmission of the data stream 3 is started, the variable bands for the data streams 1 and 2 are decreased. When the variable bands are decreased or required variable bands cannot be secured, packets to be transmitted with the variable bands are discarded. However, such packets are not immediately discarded. Instead, the discarded packet caching portion 217 and the packet discarding/restoring portion 207 try to relief such packets.

First, the case of which packets are discarded due to an insufficient band will be described. A data stream that is transmitted with a variable band can be physically thinned out. Thus, when such a data stream should be discarded, it is thinned out.

For example, picture data in interlace GIF format is not saved in the order of (0, 0), (1, 0), (2, 0), ... and so forth, but (0, 0), (10, 0), (20, 0), ..., (1, 0), (11, 0), (21, 0), ... and so forth. In other words, picture data is saved at predetermined intervals. Thus, even if the end of the data is discarded, although the picture quality deteriorates, the picture is not lost. Consequently, as much data is transmitted from the beginning as possible. The data that cannot be transmitted is discarded.

Alternatively, in a picture data compressing method according to the MPEG format, there are three types of data B, P, and I. In this method, data can be thinned out in the order of B, P, and I. This is because B data is decoded with P data and I data; and P data is decoded with I data. In other words, when I data is lost, P and B are not decoded until an occurrence of the next I data. Thus, depending on a secured band, packets of B data and P data can be discarded.

Figure 24:
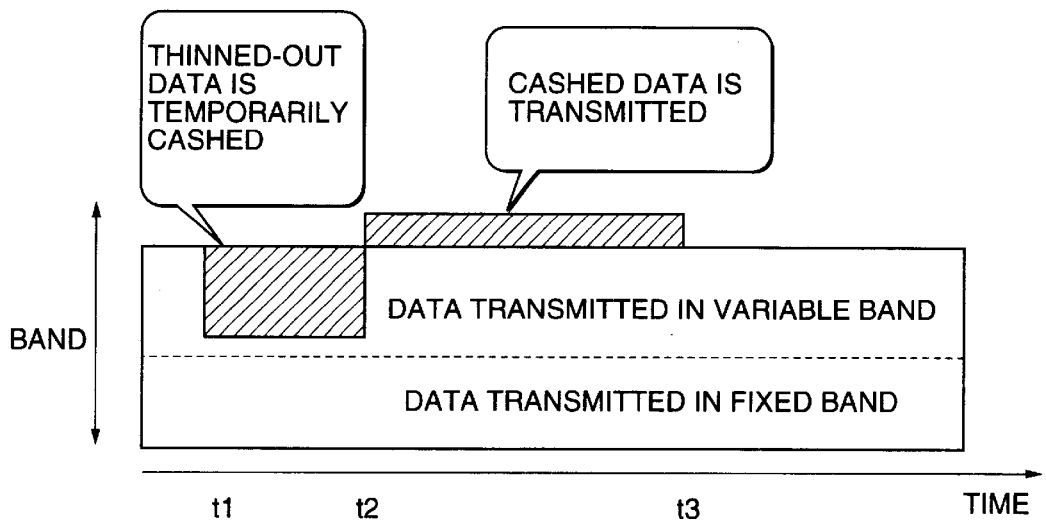
FIG. 24 is a schematic diagram showing the concept of a data retransmission.
Figure 25:
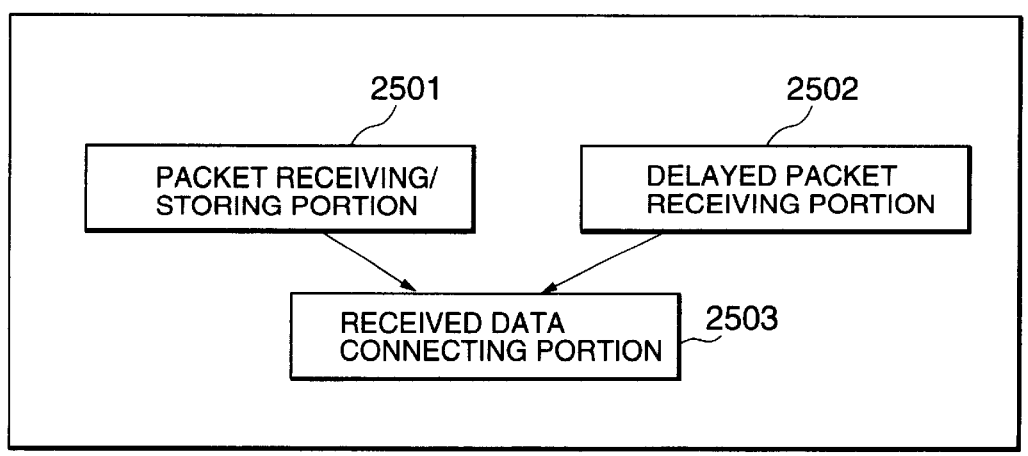
FIG. 25 is a block diagram showing an example of the structure on the client (terminal unit) side in the case of a packet alternative routing operation and a packet caching operation.

Next, with reference to FIG. 24, the process of the discarded packet caching portion 217 will be described. FIG. 24 shows a transmission situation of a particular data stream. In the case that a variable band has been decreased from time t1 to t2, the variable band is restored at time t2 and an extra band can be secured.

In this example, the discarded packet caching portion 217 caches packets that have not been transmitted in a time period from t1 to t2 due to a decrease of a band. When the busy state of the communication path is cleared and a sufficient band is secured at time t2, the packet discarding/restoring portion 207 extracts packets from the discarded packet caching portion 217. The extracted packets are transmitted along with normal packets for the variable band in a time period from t2 to t3.

The packet discarding/restoring portion 207 functions in the case that another alternative path is present as well as the conventional transmission path. The packet discarding/restoring portion 207 always monitors the band state of the alternative path. When the alternative path has a space, the packet discarding/restoring portion 207 extracts discarded packets from the discarded packet caching portion 217 and transmits the extracted packs to the alternative path.

When packets are transmitted through the alternative path or they are temporarily cached until the busy state of the communication path is cleared, the packets arrive to the client (user terminal unit) with a delay. Thus, the client comprises a packet receiving/storing portion 2501, a delayed packet receiving portion 2502, and a received data connecting portion 2503. The packet receiving/storing portion 2501 receives packets from the normal path and holds them until delayed packets arrive. The delayed packet receiving portion 2502 receives packets from the alternative path and delayed packets from the normal path after the busy state of the normal path is cleared. The received data connecting portion 2503 connects the two types of packets and restores correct data.

In this structure, although delayed packets can be handled, there is a situation of which packets should be transmitted on real time basis. Information that represents prohibition of a delay of packets or a permissible delay of packets is contained in an index. Corresponding to the information, the discarded packet caching portion 217 determines whether there are packets to be cached or immediately discarded. The packets cached in the discarded packet caching portion 217 are deleted therefrom cache when the delay time of the packets exceeds a predetermined value.

Figure 26:
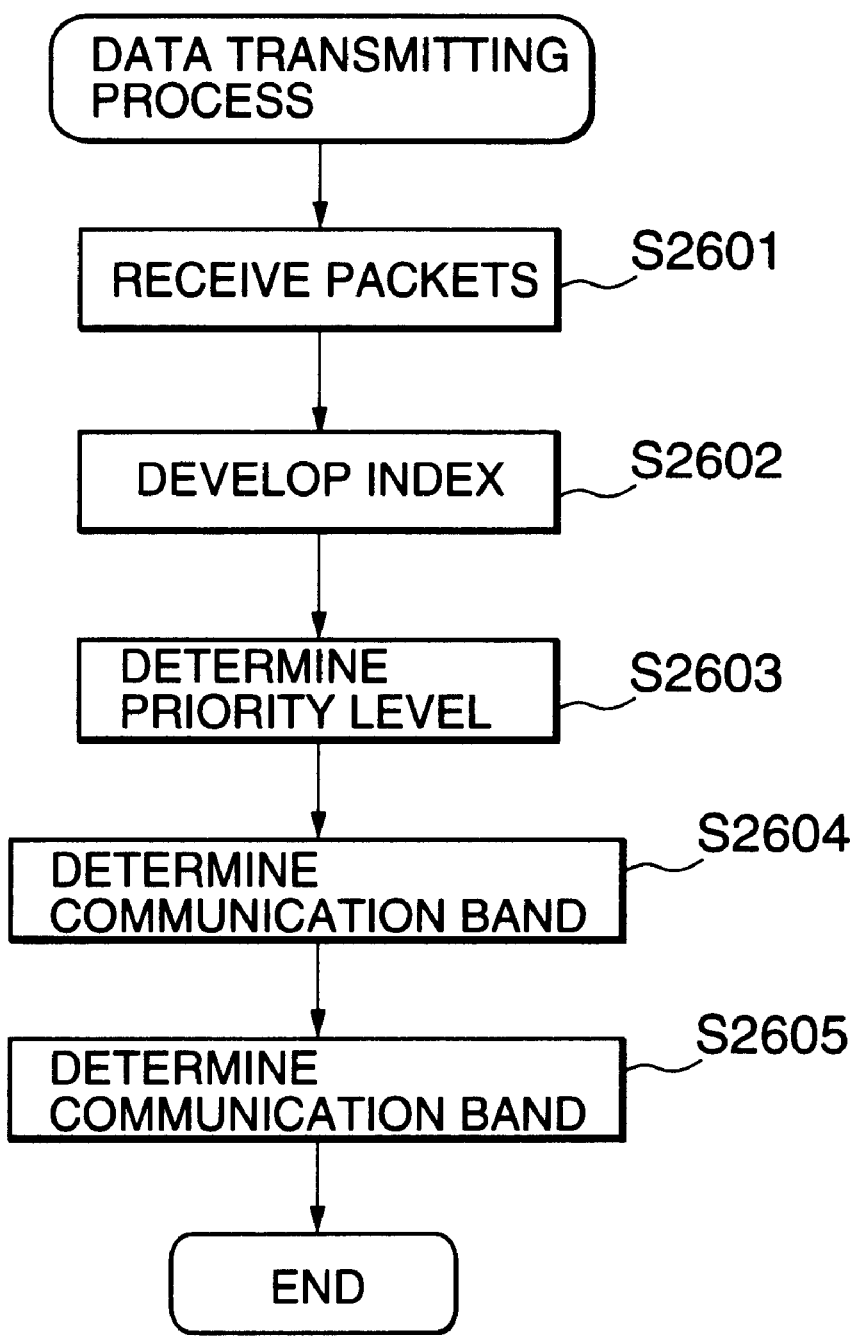
FIG. 26 is a flow chart showing a process in which each router transmits data in a data communication with an index.

In a data communication with an index, data can be transmitted by each router in a process shown in FIG. 26.

1. Receiving packets (at step S2601)

Each router and each server have respective buffers for searching and operating packets corresponding to evaluation values that depend on indexes of individual data flows. Received packets are stored in these buffers.

2. Developing indexes (at step S2602)

Evaluation values corresponding to indexes of packets of individual data flows are searched from the index tables shown in FIGS. 4 and 5 every period or every a predetermined number of periods. When an evaluation value of the same data flow does not vary, as expressed by Formula 2, the evaluation value of each packet obtained from the index table shown in FIG. 4 can be sometimes consistently used as an evaluation value of the data flow. When the number of requests is considered, as expressed by Formula 3, a function corresponding to the number of requests may be used.

$$ef_{ki}=e_i \qquad \text{(Formula 2)}$$

where $ef_{ki}$ is an evaluation value of a flow i in a particular period k; and $e_i$ is an evaluation value of a flow i on an index table.

$$ef_{ki}=H(e_i, r_i) \qquad \text{(Formula 3)}$$

where $r_i$ is the number of requests to a flow i; and H is a function considering the number of requests to an evaluation value.

When an evaluation value is designated in the same data as with a scene index, a statistical process is performed for an evaluation value searched for each flow as expressed by Formula 4. The statistical value is preferably used as an evaluation value of each flow. As an example of the statistical value, a value that represents each flow or a value that represents the comparison of each flow (such as a total value, an evaluation value, a normalized value of evaluation values of packets) can be used. When the number of requests is considered, as with Formula 5, a function corresponding to the number of requests may be used.

$$ef_{ki}=G(e_i*s_{ki1}, e_i*S_{ki2}, \ldots e_i*S_{kij}, \ldots) \quad \text{(Formula 4)}$$

where $ef_{ki}$ is an evaluation value of a flow i in a particular period k; $e_i$ is an evaluation value of a flow i on an index table; and G is a function of a statistical process for an evaluation value of each packet.

$$ef_{ki}=H(G(e_i*s_{ki1}, e_i*S_{ki2}, \ldots e_i*S_{kij}, \ldots), r_i) \quad \text{(Formula 5)}$$

where $r_i$ is the number of requests to a flow i; and H is a function for considering the number of requests to an evaluation value.

In the case that evaluation values of data are designated for individual medium types of picture data, sound data, text data, and so forth, when a band width of each medium type can be varied, any process corresponding to Formula 2 to Formula 5 can be performed for each medium type.

3. Designating priority levels (at step S2603)

With an evaluation value of each data flow in each period, a priority level of each data flow is designated. A priority level designating function depends on an evaluation value and a type thereof. As a simple example, as with the case that an evaluation value of each data flow is obtained in Formula 2 to Formula 5, if an evaluation value is represented by a numeric and if a larger value has a larger evaluation, as expressed by Formula 6, the ratio of an evaluation value of each data flow to the total of evaluation values of all data flows is used as a priority level of each data flow.

Alternatively, an evaluation value of a data flow can be treated as a priority level.

$$P_{ki}=ef_{ki}/\Sigma ef_{kn}(n=1, 2, 3, \ldots, i) \quad \text{(Formula 6)}$$

where $ef_{ki}$ is an evaluation value of a flow i in a particular period k; and $P_{ki}$ is a priority level of a flow i in a particular period k.

In the case that evaluation values of data are designated for individual medium types of picture data, sound data, character data, and so forth, when a band width of each medium type can be varied, a process corresponding to Formula 6 can be performed for each medium type.

4. Determining band width (at step S2604)

A band width assigned for each data flow is the sum of a fixed band and a variable band.

Since fixed bands have been secured by the scheduling system when the band widths of the router and server have secured, variable bands are assigned for individual data flows. As an example, a variable band is assigned for each data flow corresponding to a priority level. The assigning method depends on the method for assigning a priority level. As a simple example, as with the process corresponding to Formula 6, if the ratio of an evaluation value of each data flow to the total of evaluation values of all data flows is a priority level of each data flow, the band width of each data flow is obtained with the product of the band width of the entire variable bands of the communication path and the priority level as expressed by Formula 7.

$$b_{ki}=p_{ki}*b_{kT} \quad \text{(Formula 7)}$$

where $b_{ki}$ is a priority level of a flow i in a particular period k; $b_{kT}$ is a total variable band width for a data communication in a particular period k; and $p_{ki}$ is a variable band width for a data communication of a flow i in a particular period k.

5. Transmitting packets (at step S2605)

Packets are transmitted corresponding to a band width assigned for each data flow. Thus, some packets are discarded in the following two methods. In the first method, packets are discarded from a data flow with a lower priority level. The priority level can be determined with an evaluation value of an index. In the second method, packets are discarded from each data flow corresponding to a lower priority level. In this embodiment, the second method will be described.

In the following description, a communication control will be described using "emergency information". With an index for emergency information, information can be transmitted as privileged information regardless of a conventional scheduling rule. For example, when a disaster such as an earthquake occurs, many communication requests to a disaster site take place, resulting in congestion of the communication path. Thus, a situation of which emergency communications using special numbers (for example "110" and "119" in Japan and "911" in United States) cannot be used takes place. In this situation, with an index of "emergency communication", this communication request can be processed earlier than other communication requests as privileged request. In the case that the highest priority level is designated to an emergency communication, corresponding to the above-described scheduling rule, if other services use all bands, the band for the emergency communication cannot be secured. Thus, a special scheduling system for securing a band width for an emergency communication is required. With this special scheduling system, since the fixed bands decrease, the quality of the other services deteriorates. When a communication request is scheduled, it is determined whether or not the index thereof is "emergency communication".

This technology has been used for earthquake information and news flash of election returns using telop (television opaque projector) on TV screens. In a network using a VOD (Video On Demand) system, even if information is transmitted with the full band, when necessary, emergency information can be transmitted.

However, with reference to the emergency information, using an information filtering system that will be described later, unnecessary information can be masked on user's responsibility. For example, the user can mask news flash of election returns or non-local disaster information.

However, in this technology, when many emergency communication requests take place and the network cannot process them on real time basis (in other words, communication bands become insufficient), all communication requests are counted and a macroscopic distribution thereof is obtained. Thus, disaster countermeasures such as dispatching of ambulances can be taken.

When fixed bands are scheduled for communication requests, if emergency communication requests cannot be processed on real time basis, with an evaluation of delay time of the emergency communication requests, the occurrence frequency and occurrence distribution thereof can be estimated.

As another embodiment of the present invention, an example of which personal information or terminal information is added to an index will be described. From view points of loss, work efficiency, privacy/secret, contents of contracts, and so forth, services corresponding to subscribers and terminal units thereof can be automatically adjusted.

For example, from a view point of loss:

It is wasteful to transmit data with a higher resolution than the resolution of a terminal unit. When data is printed out, the required resolution is around 300 dpi. However, when data is displayed on the screen, the required resolution is around 72 dpi. When the resolutions of data can be automatically distinguished, the amount of the communication data can be reduced to ⅓ or less. In addition, it is wasteful to transmit color information to a monochrome terminal unit. In other words, the CRT resolution of a monochrome terminal unit is 8 bits, whereas the CRT resolution of a color terminal unit is 256 bits.

It is wasteful to transmit multimedia data to a user who has some handicap. Thus, picture data and text data can be transmitted to users who have hearing problems. Sound data and braille data can be transmitted to users who have sight problems.

To prevent wasteful data from being transmitted, when a terminal unit issues a service request to the server, information with respect to the terminal unit and the user is added to the service request. The server processes data in a data resolution corresponding to the terminal unit and the user and sends the resultant data to the communication path. Thus, wasteful information that is not used and thereby discarded on the terminal unit side can be prevented from being transmitted. Consequently, the communication resources can be effectively used.

From a view point of work efficiency, it is difficult for a sales person to search sales data from technical information. Thus, it is desired to structure multi-faceted database (data warehouse) and effectively use it. With an index, the user can effectively search desired data from the database.

From a view point of privacy/secret, by circulating a personal index (similar to a machine IP address) that is partially publicized, with an encrypted communication and a personal certificate, personal information, company information, official information can be prevented from illegally leaking out.

As contents of contracts, several levels of contents of contracts can be considered. With an index of contents of a contract, the contents of services can be automatically changed.

As a third embodiment, the present invention can be applied for an information filtering operation. For various users such as a person, a region, and a nation, it is becoming an important problem to shut out unnecessary or disadvantageous information as a huge network environment such as Internet is growing. In addition, in free information flows on Internet, personal privacy, public order and morals, and national interest have not been sufficiently protected by laws.

Such problems can be solved by an index that communication data has. For example, when nations, providers, juridical persons, peoples, and so forth publicize a range of data that they handle or they do not handle using respective indexes, they can unilaterally refuse data that they do not handle. Thus, unmoral information and uninterested information can be automatically refused. At the same time, necessary information can be selected.

Figure 27:
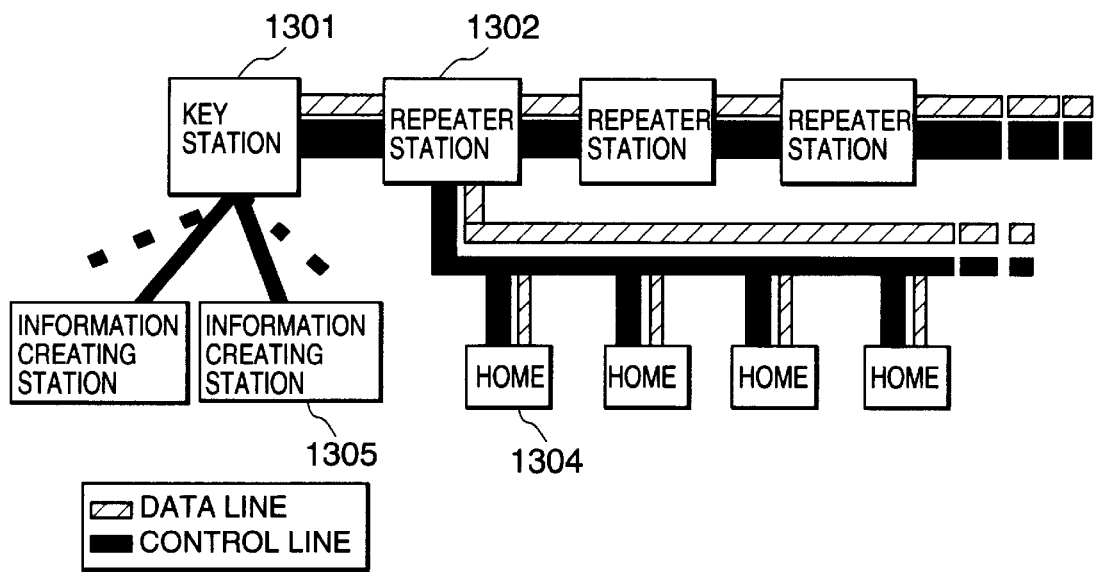
FIG. 27 is a schematic diagram showing an example of an integrated public information communication network.
Figure 28:
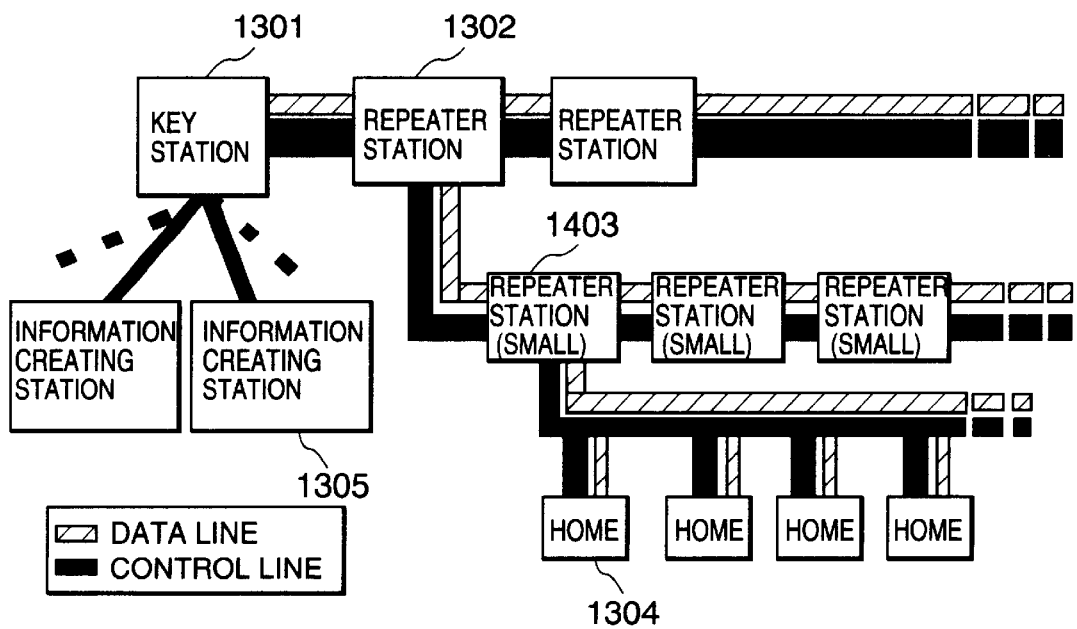
FIG. 28 is a schematic diagram showing an example of a large-scaled integrated public information communication network.

FIG. 27 shows a structure of an integrated public information communication network. FIG. 28 shows a large-scaled integrated public information communication network. In these networks, the above-described communication network using an index is applied to a service for circulating programs of news, movies, music, and so forth, a computer network service, or a public infrastructure for telephone services.

Each structural portion has at least each structural portion of the above-described communication portion using an index.

As the relation of individual structural portions, a key station 1301 corresponds to the server 100. A repeater station 1302 and a repeater station (small) 1403 correspond to the router 200. A home 1304 corresponds to the terminal unit 300. An information creating station 1305 corresponds to an index data creating portion 400.

According to the present invention, communication resources can be assigned to many unspecified communication requests corresponding to transmission information thereof. In addition, corresponding to the content of the information, the assignments of the communication resources can be dynamically changed. In other words, when bands required for communication requests are divided into fixed bands and variable bands and separately scheduled, the following effects can be obtained.

Only information that is absolutely required is transmitted with a fixed band, information with higher quality that is not required (for example, picture data) is suppressed from being transmitted. Thus, the traffic amount can be decreased.

Since fixed bands are scheduled for communication requests, even if the communication path is busy, a communication request is not refused, but processed. Thus, the user can be informed of the service start time and service end time unlike with the conventional system.

With a bid period, communication resources can be scheduled for communication requests in the order of priority levels thereof. Thus, services can be weighted.

In the case that the communication path is busy and more data cannot be transmitted, since variable bands are coordinated among communication requests, the probability of which a data flow corresponding to a communication request can be transmitted is increased.

Corresponding to a loaded situation of a communication path, additional information can be

What is claimed is:

1. An apparatus for transmitting communication information by using a communication resource, the apparatus comprising:

means for adding an index that represents a content of the communication information to be transmitted to the communication information;

means for determining the content of the communication information to be transmitted according to the added index; and means for securing a required communication resource from the communication resource according to the determined content.

2. The apparatus as set forth in claim 1, wherein the required communication resource has:

a fixed communication resource portion that is fixed while the communication information is being transmitted; and a variable communication resource portion that is varied according to an actual situation.

3. The apparatus as set forth in claim 2, further comprising:

means for managing a resource securing situation of the communication resource, wherein said securing means secures the fixed communication resource portion and/or the variable communication resource portion according to the determined content and the resource securing situation, and controls a volume of the variable communication resource portion according to the determined content and the resource securing situation.

4. The apparatus as set forth in claim 3, wherein the volume of the variable communication resource portion is periodically controlled.

5. The apparatus as set forth in claim 2, further comprising:
means for packeting the communication information to be transmitted;
means for discarding the packeted communication information according to a decrease of the variable communication resource portion;
means for storing temporarily the discarded packet; and
means for restoring the temporarily stored packet according to an increase of the variable communication resource portion.

6. The apparatus as set forth in claim 2, further comprising:
means for packeting the communication information to be transmitted;
means for storing the packeted communication information that have not been transmitted with the variable communication resource portion;
means for determining whether or not there is an available alternative communication resource; and
means for transmitting the stored packet by use of the available alternative communication resource.

7. An apparatus for assigning a required communication resource from a communication resource according to a transmission request of communication information, the apparatus comprising:
means for reserving temporarily the required communication resource according to the transmission request;
means for scheduling the temporary reservation in a predetermined bid period; and
means for changing the temporary reservation to a permanent reservation according to the scheduling.

8. The apparatus an set forth in claim 7,
wherein the communication information to be transmitted includes a priority level information about assigning the required communication resource, and
wherein said scheduling means schedules the temporary reservation according to the priority level information of the communication information that is transmission-requested.

9. The apparatus as set forth in claim 8,
wherein said scheduling means schedules the temporary reservation by evaluating the priority level information of the communication information that is transmission-requested in the bid period at a time every transmission request is made.

10. The apparatus as set forth in claim 8,
wherein said scheduling means schedules the temporary reservation by evaluating the priority level information of the communication information that is transmission-requested in the bid period after the completion of the bid period.

11. The apparatus as set forth in claim 8,
wherein said scheduling means further determines the length of the bid period according to the priority level information of the communication information that is transmission-requested and schedules the temporary reservation in the bid period.

12. The apparatus as set forth in claim 8,
wherein the required communicative resource to be assigned is categorized as a first portion that cannot be decreased and should be secured as a minimum portion and a second portion that can be decreased in a busy state of the communication resource, and
wherein said scheduling means schedules the temporary reservation after the completion of the bid period by considering the priority level information of the communication information that is transmission-requested and deleting the second portion from the required communication resource.

13. A method for transmitting communication information by using a communication resource, comprising:
(a) adding an index that represents a content of the communication information to be transmitted to the communication information;
(b) determining the content of the communication information to be transmitted according to the added index; and
(c) securing a required communication resource from the communication resource according to the determined content.

14. The method as set forth in claim 13,
wherein the required communication resource has:
a fixed communication resource portion that is fixed while the communication information in being transmitted; and
a variable communication resource portion that is varied according to an actual situation.

15. The method as set forth in claim 14, further comprising:
managing a resource securing situation of the communication resource,
wherein the (c) comprises:
(c1) securing the fixed communication resource portion and/or the variable communication resource portion according to the determined content and the resource securing situation; and
(c2) controlling a volume of the variable communication resource portion according to the determined content and the resource securing situation.

16. The method as set forth in claim 15,
wherein the (c2) is performed by periodically controlling the volume of the variable communication resource portion.

17. The method as set forth in claim 14, further comprising:
packeting the communication information to be transmitted;
discarding the packeted communication information according to a decrease of the variable communication resource portion;
storing temporarily the discarded packet; and
restoring the temporarily stored packet according to an increase of the variable communication resource portion.

18. The method as set forth in claim 14, further comprising:
packeting the communication information to be transmitted;
storing the packeted communication information that have not been transmitted with the variable communication resource portion;

determining whether or not there is an available alternative communication resource; and transmitting the stored packet by use of the available alternative communication resource.

19. A method for assigning a required communication resource from a communication resource according to a transmission request of communication information, the method comprising:
   (a) reserving temporarily the required communication resource according to the transmission request;
   (b) scheduling the temporary reservation in a predetermined bid period; and
   (a) changing the temporary reservation to a permanent reservation according to the scheduling.

20. The method as set forth in claim 19,
   wherein the communication information to be transmitted includes a priority level information about assigning the required communication resource, and
   wherein the (b) is performed by scheduling the temporary reservation according to the priority level information of the communication information that is transmission-requested.

21. The method as set forth is claim 20,
   wherein the (b) is performed by evaluating the priority level information of the communication information that is transmission-requested in the bid period at the time every transmission request is made.

22. The method as set forth in claim 20,
   wherein the (b) is performed by evaluating the priority level information of the communication information that is transmission-requested in the bid period after the completion of the bid period.

23. The method as act forth in claim 20,
   wherein the (b) is performed by determining the length of the bid period according to the priority level information of the communication information that is transmission-requested and scheduling the temporary resource in the bid period.

24. The method as set forth in claim 20,
   wherein the required communication resource to be assigned is categorized as a first portion that cannot be decreased and should be secured as a minimum portion and a second portion that can be decreased in a busy state of the communication resource, and
   wherein the (b) is performed by scheduling the temporary reservation after the completion of the bid period by considering the priority level information of the communication information that is transmission-requested and deleting the second portion from the required communication resource.

25. A record medium on which a program for an apparatus for transmitting communication information by using a communication resource is recorded, the program performing the functions of:
   (a) adding an index that represents a content of the communication information to be transmitted to the communication information;
   (b) determining the content of the communication information to be transmitted according to the added index; and
   (c) securing a required communication resource from the communication resource according to the determined content.

26. A record medium on which a program for an apparatus for assigning a required communication resource from a communication resource according to a transmission request of communication information is recorded, the program performing the functions of:
   (a) reserving temporarily the required communication resource according to the transmission request;
   (b) scheduling the temporary reservation in a predetermined bid period; and
   (c) changing the temporary reservation to a permanent reservation according to the scheduling.

* * * * *

UNITED STATES PATENT AND TRADEMARK OFFICE
CERTIFICATE OF CORRECTION

PATENT NO. : 6,330,603 B1
DATED : December 11, 2001
INVENTOR(S) : Toshibumi Seki et al.

It is certified that error appears in the above-identified patent and that said Letters Patent is hereby corrected as shown below:

Column 1,
Line 50, change "decreases" to -- decreased --.

Column 8,
Line 39, delete "are".

Column 10,
Line 65, change "$e_{pi}$" to -- $e_{pj}$ --.

Column 11,
Line 39, change "A" to -- a --.

Column 22,
Line 40, after "be", insert the following:
-- dynamically added. Thus, information with required quality or higher can be transmitted. For example, in one communication flow, picture data or sound data with a high quality portion (such as climax) can be transmitted. Thus, users' requests can be satisfied.
    According to the present invention, communication resources can be assigned for many unspecified communication requests corresponding to the contents of transmission information thereof. In addition, corresponding to the contents of the information, the communication resources can be dynamically assigned. Moreover, a network that quickly deals with disasters and the like can be structured. Furthermore, data against public order and morals can be prevented from being received. In addition, with a compromise of a user, communication resources can be secured.
    Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. --

Column 23,
Line 43, change "an" to -- as --.

UNITED STATES PATENT AND TRADEMARK OFFICE
CERTIFICATE OF CORRECTION

PATENT NO. : 6,330,603 B1
DATED : December 11, 2001
INVENTOR(S) : Toshibumi Seki et al.

It is certified that error appears in the above-identified patent and that said Letters Patent is hereby corrected as shown below:

<u>Column 25,</u>
Line 14, change "(a)" to -- (c) --.
Line 35, change "act" to -- set --.

Signed and Sealed this

Twenty-fifth Day of June, 2002

*Attest:*

JAMES E. ROGAN
*Director of the United States Patent and Trademark Office*

*Attesting Officer*